United States Patent
Gopal et al.

(10) Patent No.: US 9,859,918 B1
(45) Date of Patent: Jan. 2, 2018

(54) TECHNOLOGIES FOR PERFORMING SPECULATIVE DECOMPRESSION

(71) Applicant: Intel Corporation, Santa Clara, CA (US)

(72) Inventors: Vinodh Gopal, Westborough, MA (US); James D. Guilford, Nrthborough, MA (US); Kirk S. Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/473,778

(22) Filed: Mar. 30, 2017

Related U.S. Application Data

(60) Provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
    *H03M 7/40* (2006.01)
    *H03M 7/30* (2006.01)

(52) U.S. Cl.
    CPC ........... *H03M 7/40* (2013.01); *H03M 7/4056* (2013.01); *H03M 7/6023* (2013.01)

(58) Field of Classification Search
    None
    See application file for complete search history.

(56) References Cited

U.S. PATENT DOCUMENTS

| | | | | |
|---|---|---|---|---|
| 5,757,295 A | * | 5/1998 | Bakhmutsky | H03M 7/425 341/67 |
| 6,043,765 A | * | 3/2000 | Twardowski | H03M 7/4081 341/65 |
| 8,610,604 B2 | * | 12/2013 | Glass | H03M 7/6076 341/51 |
| 9,252,805 B1 | * | 2/2016 | Abali | H03M 7/40 |
| 9,484,954 B1 | * | 11/2016 | Gopal | H03M 7/4037 |
| 2015/0227565 A1 | * | 8/2015 | Amit | H03M 7/40 707/797 |

* cited by examiner

*Primary Examiner* — Howard Williams
(74) *Attorney, Agent, or Firm* — Barnes & Thornburg LLP

(57) ABSTRACT

Technologies for performing speculative decompression include a managed node to decode a variable size code at a present position in compressed data with a deterministic decoder and concurrently perform speculative decodes over a range of subsequent positions in the compressed data, determine the position of the next code, determine whether the position of the next code is within the range, and output, in response to a determination that the position of the next code is within the range, a symbol associated with the deterministically decoded code and another symbol associated with a speculatively decoded code at the position of the next code.

25 Claims, 20 Drawing Sheets

TECHNOLOGIES FOR PERFORMING SPECULATIVE DECOMPRESSION

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

In a typical data center, multiple compute devices may coordinate through a network to execute workloads (e.g., applications, processes, threads, etc.) requested by a client device (e.g., a customer). In executing the workloads, the compute devices may retrieve and store data from and to data storage devices through the network. To increase the speed of communicating the data through the network, the data may be compressed prior to transmission (e.g., retrieved in a compressed form from a data storage device). However, clock cycles are then spent on the receiving compute device to decompress the data. The time spent decompressing the data may adversely affect the speed at which the corresponding workload is executed.

A popular form of compression is entropy encoding, such as Huffman encoding. Decompressing a Huffman encoded data set is typically a sequential process in which a compute device initially parses a data structure known as a tree descriptor. The tree descriptor indicates multiple variable size codes and associated symbols, and the sizes of the codes are inversely proportional to the frequency of the symbols in the decompressed form of the data (e.g., characters, numbers, pointers to other sections of the data, etc.). Decompression proceeds by replacing each variable size code with the corresponding symbol. However, given that the codes are of variable size, the position of the next variable size code in the compressed data set is unknown until the variable size code at the present position is decoded (e.g., the corresponding symbol is identified). As such, the lack of information about the position of the next variable sized code causes the data be decompressed sequentially (e.g., one variable sized code at a time), and represents a fundamental limiter of performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
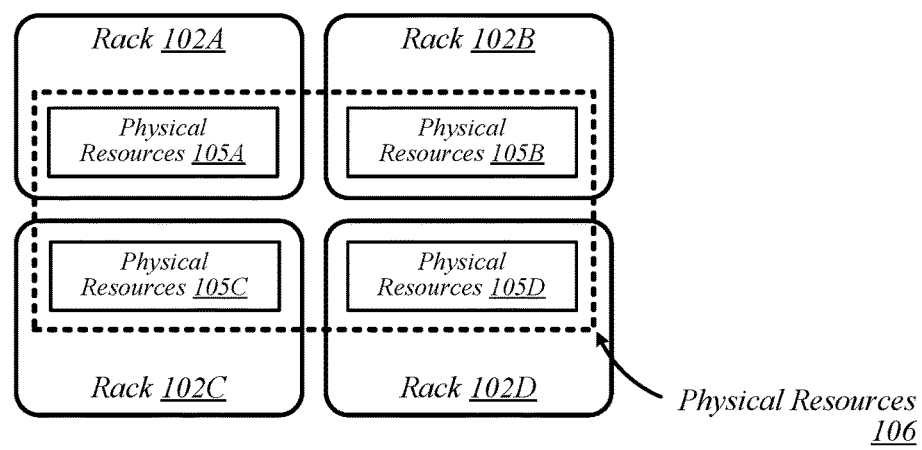
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. In the present description, near memory may be embodied as any memory, such as volatile memory, coupled to the host central processing unit via a high bandwidth, low latency connection for efficient processing while far memory may be embodied as any memory, such as volatile or nonvolatile memory storage, that is larger and slower than the near memory, and is typically coupled to the central processing unit via a comparatively lower bandwidth and/or higher latency connection. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low-latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
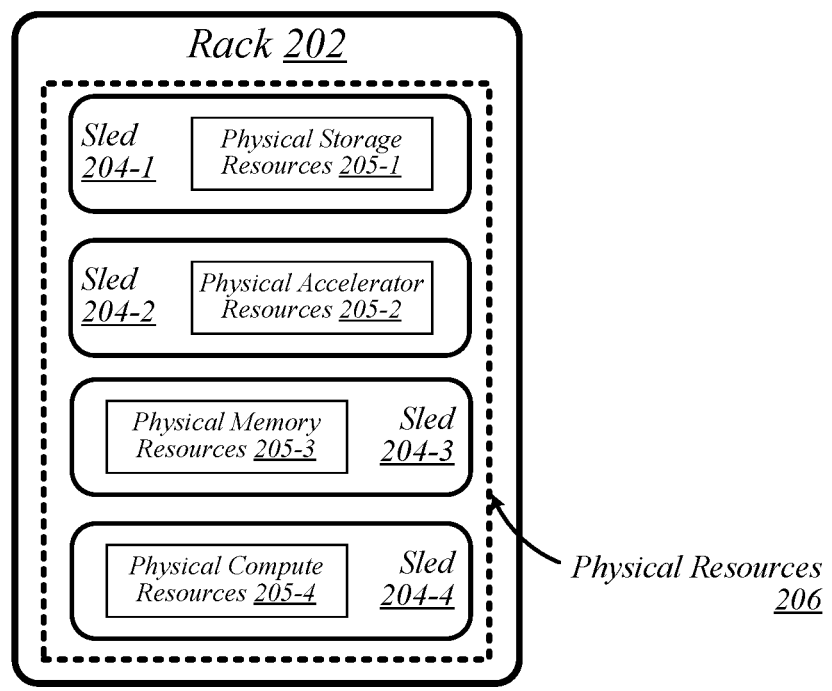
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
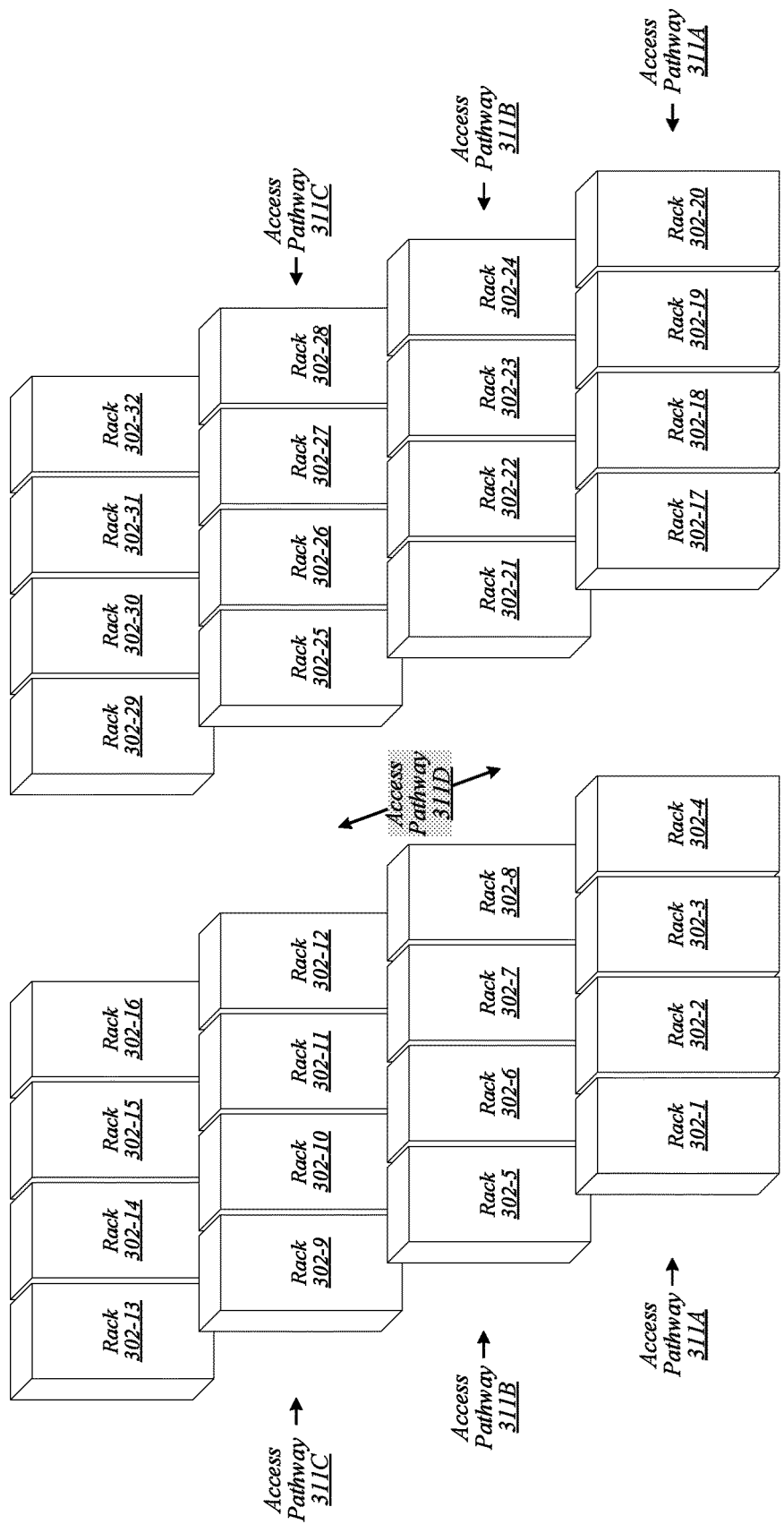
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
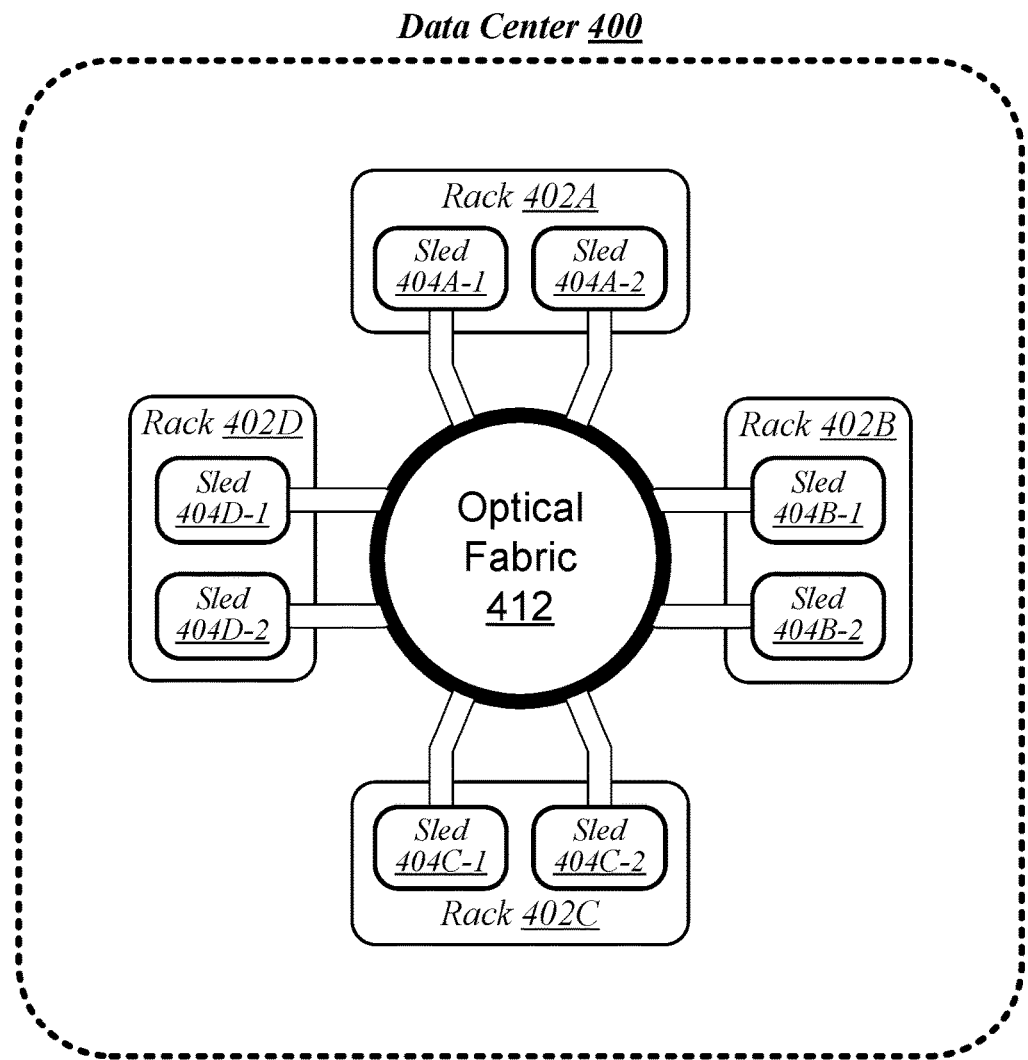
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
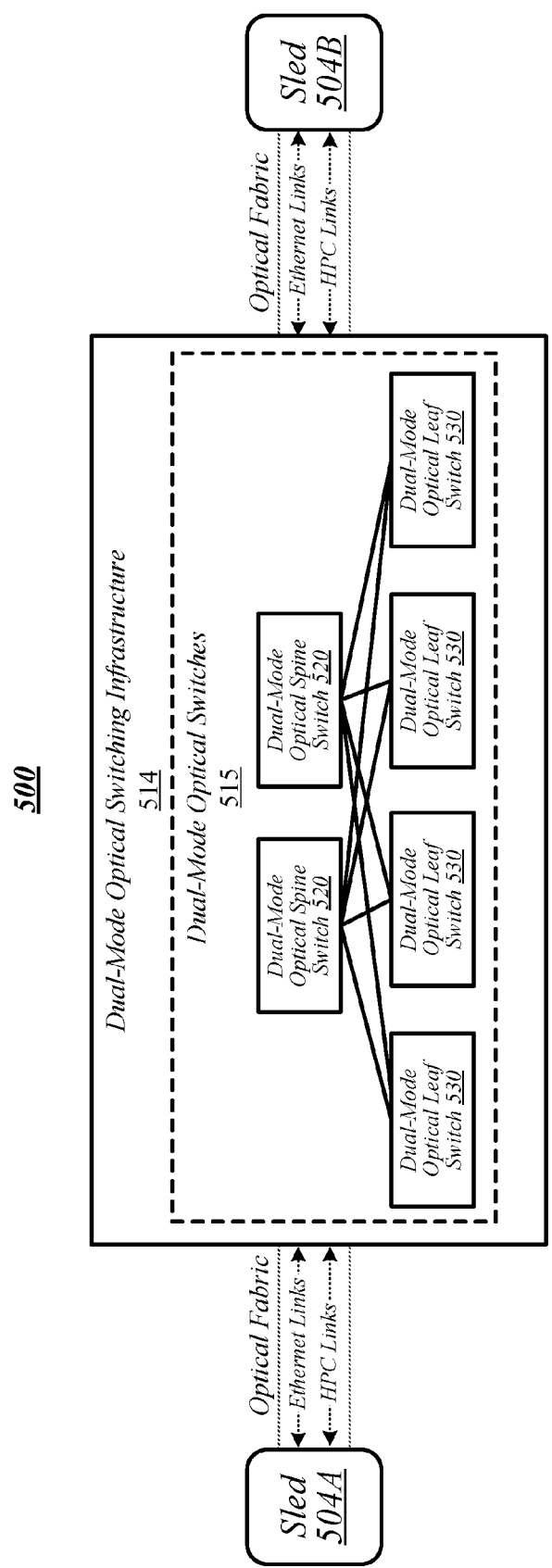
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
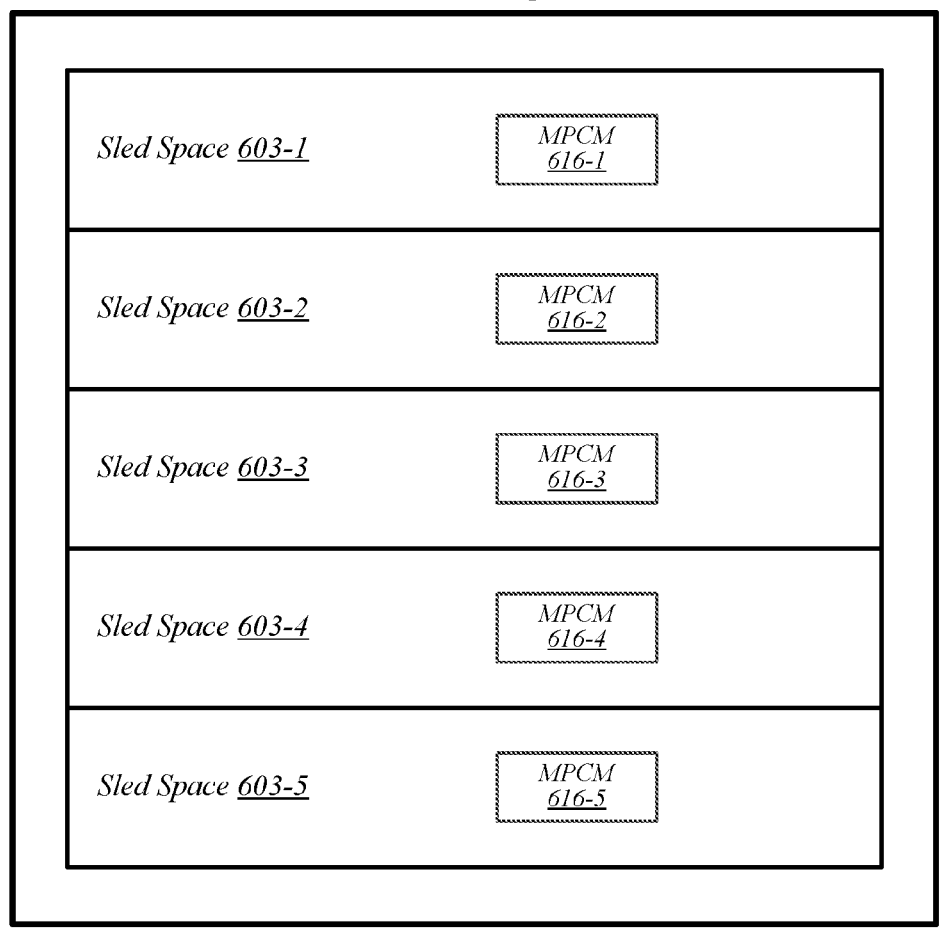
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
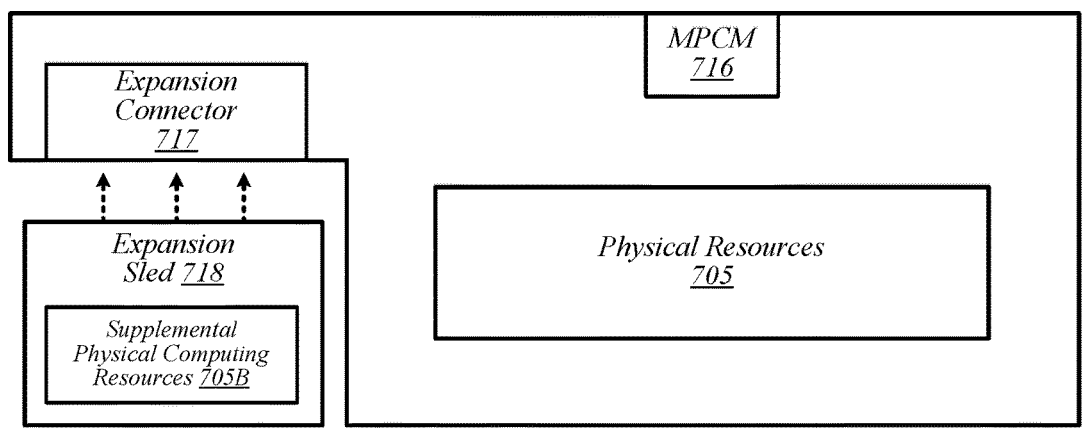
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
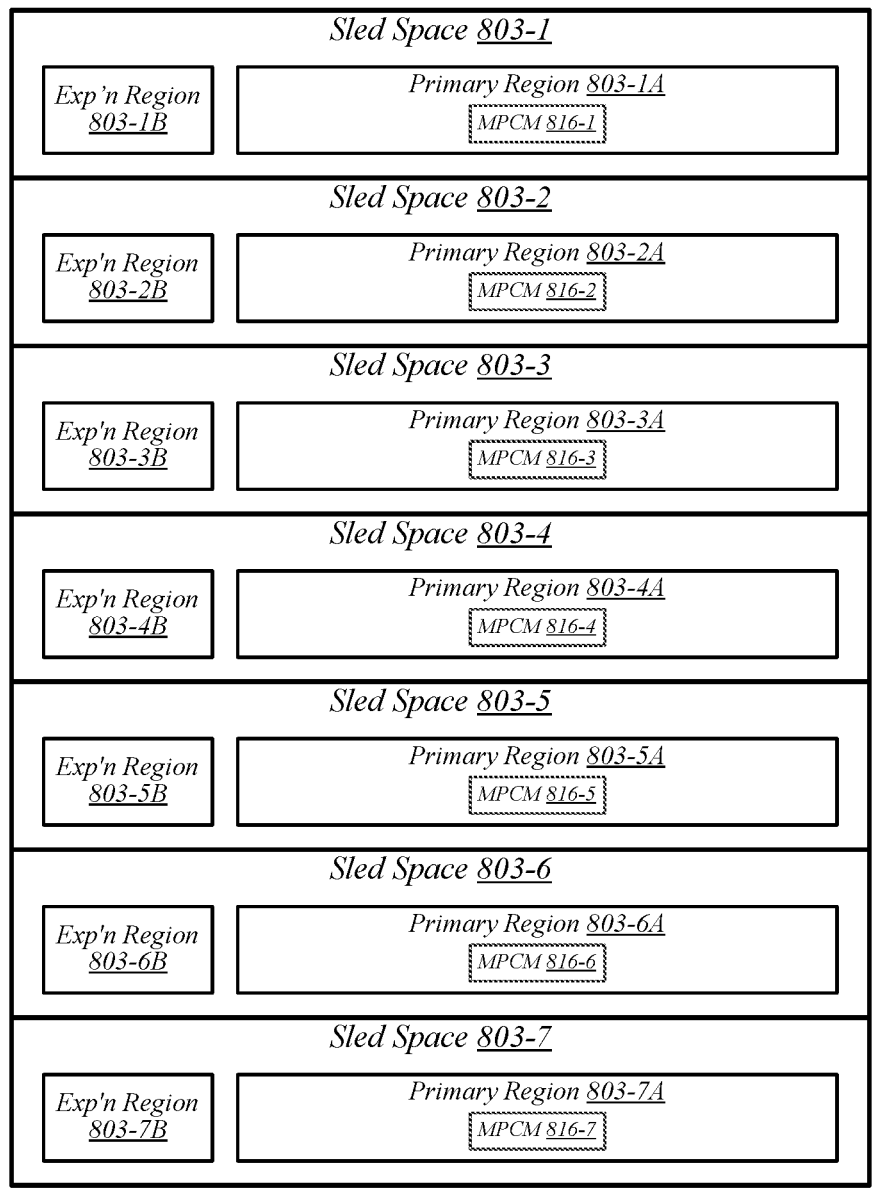
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
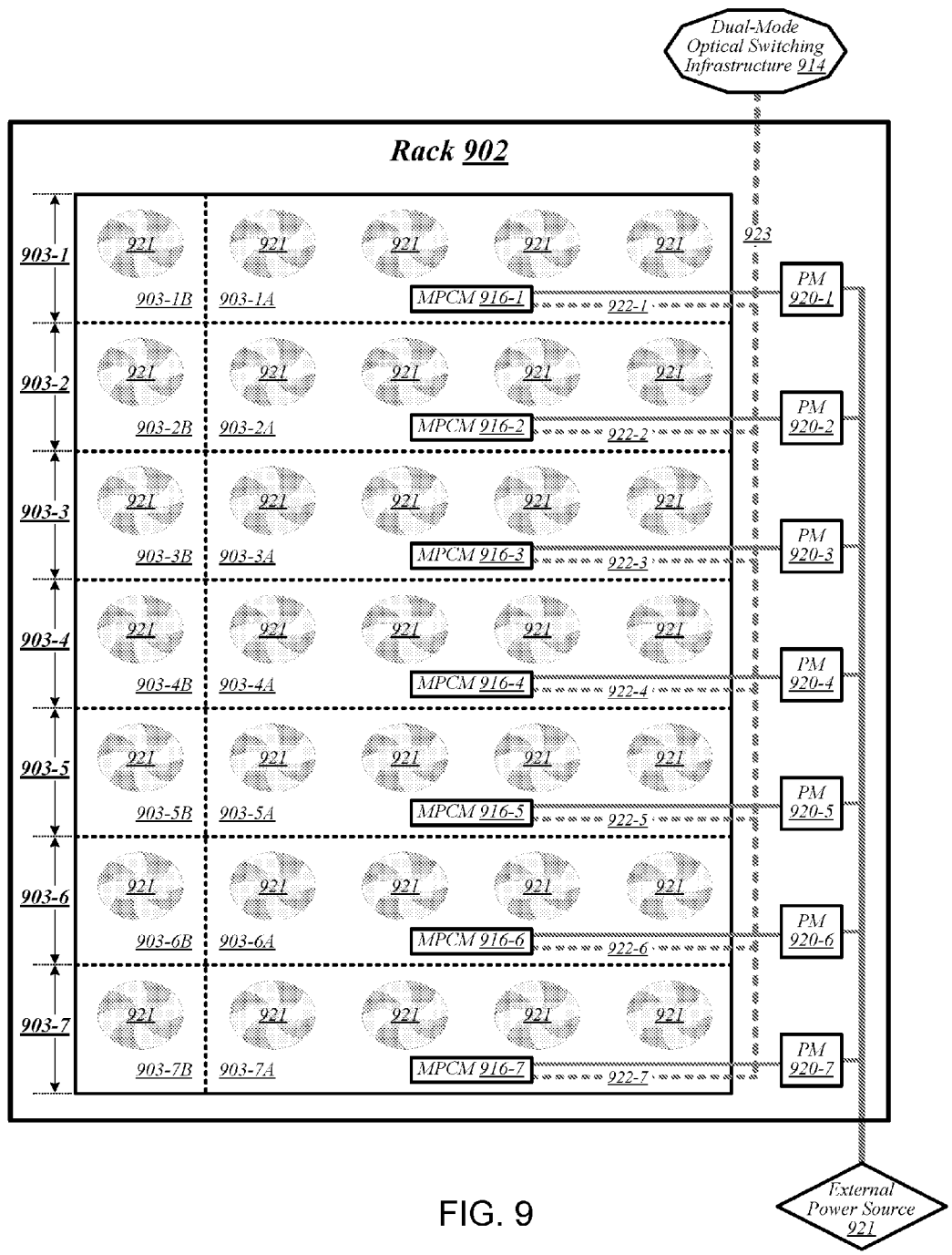
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
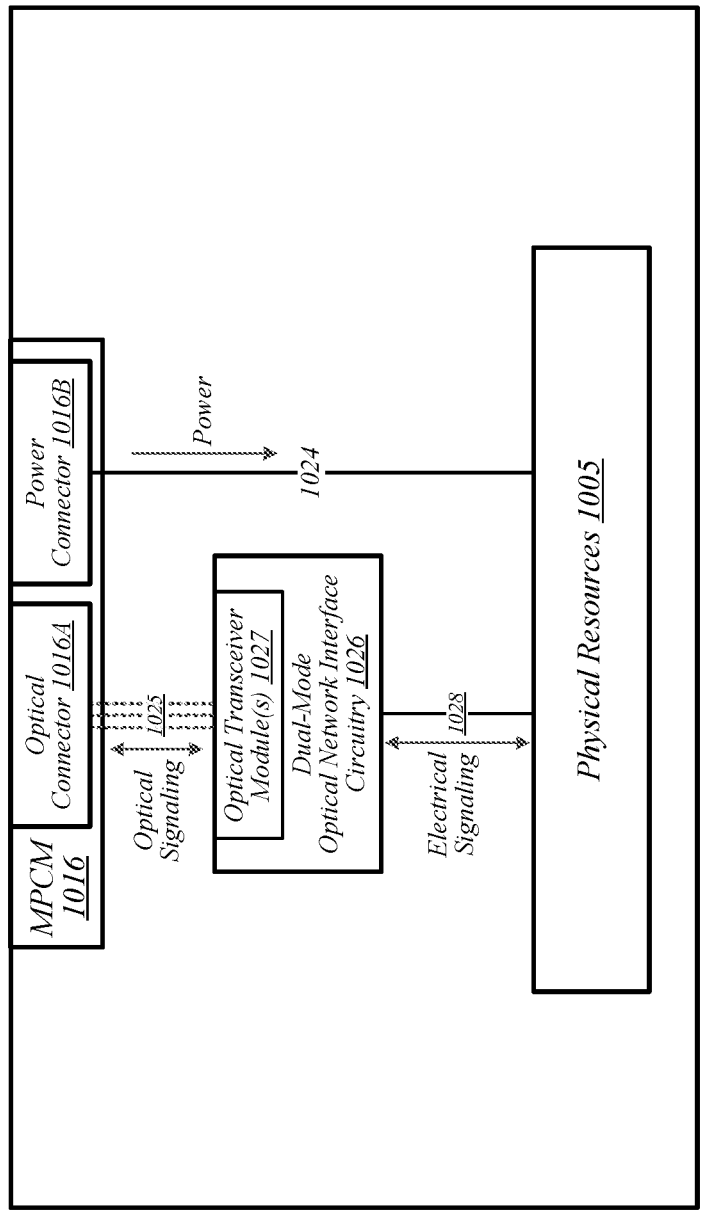
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
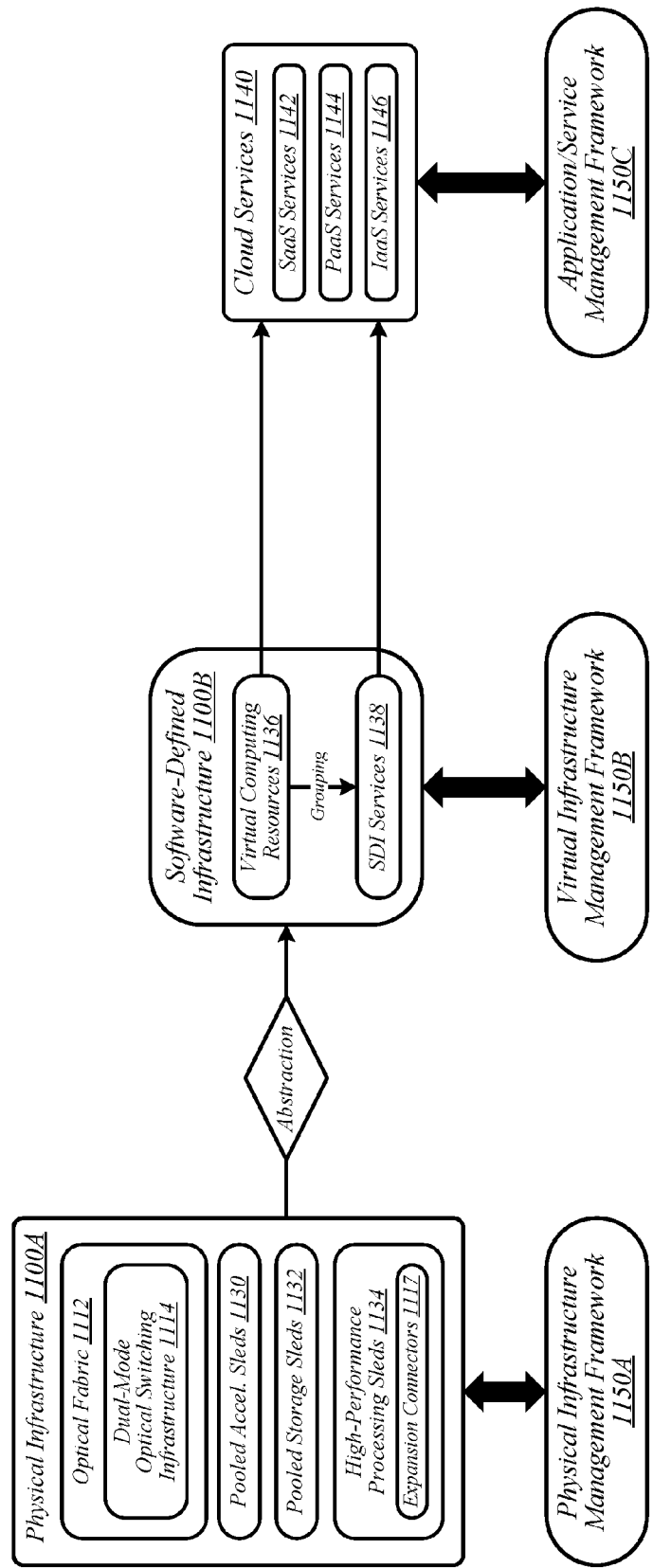
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs) (e.g., a controller coupled to a non-volatile memory chip, such as NAND, and an interface to a host device). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a memory expansion sled, such that the memory that is locally available to that high-performance processing sled 1134 is disaggregated from the processors and near memory comprised on that sled. In some embodiments, such a high-performance processing sled 1134 may be configured with memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
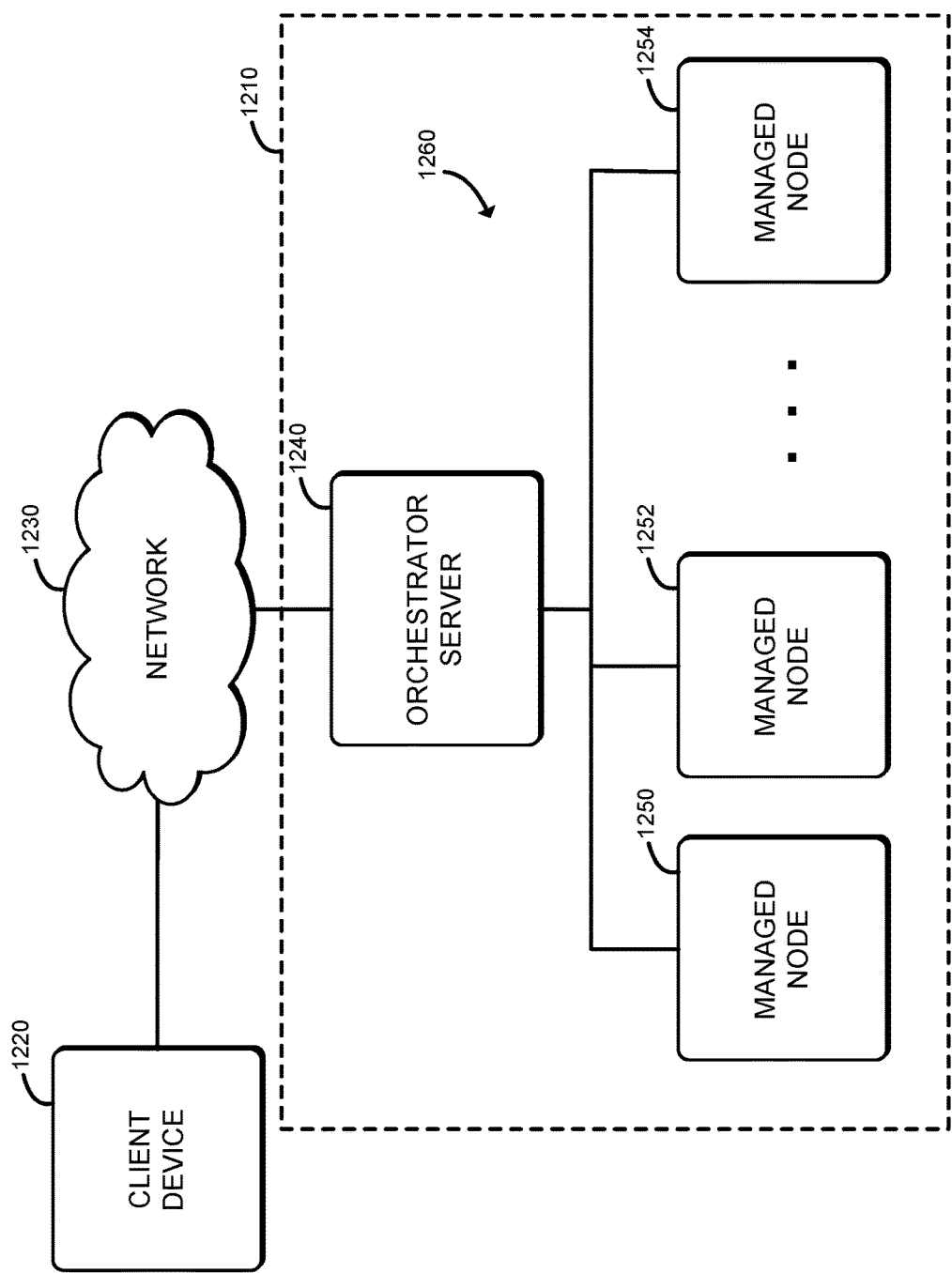
FIG. 12 is a simplified block diagram of at least one embodiment of a system for performing speculative decompression of data.

As shown in FIG. 12, an illustrative system 1210 for performing speculative decompression includes a set of managed nodes 1260 in communication with each other and with an orchestrator server 1240. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Each managed node 1260 may be established, defined, or "spun up" by the orchestrator server 1240 at the time a workload is to be assigned to a managed node 1260 or at any other time, and may exist regardless of whether any workloads are presently assigned to the managed node 1260. The system 1210 may be implemented in accordance with the data centers 100, 300, 400, 1100 described above with reference to FIGS. 1, 3, 4, and 11. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The system 1210 may be located in a data center and provide storage and compute services (e.g., cloud services) to a client device 1220 that is in communication with the system 1210 through a network 1230. The orchestrator server 1240 may support a cloud operating environment, such as OpenStack, and assign workloads to the managed nodes 1260 for execution.

The managed nodes 1260 may execute the workloads, such as in virtual machines or containers, on behalf of a user of the client device 1220. Managed nodes 1260 executing respective workloads may issue separate requests to read data and/or write data from or to one or other resources available in the system 1210 (e.g., physical storage resources 205-1, one or more physical memory resources 205-3, etc.). To reduce the amount of data transmitted between the resources in the system 1210, the data may be compressed (e.g., by a resource of a managed node 1260) prior to transmission, and decompressed (e.g., by another resource of a managed node 1260) after receipt of the data. In the illustrative embodiment, a managed node 1260 may compress and decompress data using entropy encoding, such as Huffman encoding/decoding, with a set of trees. In the illustrative embodiment, a tree may be embodied as an abstract data structure that simulates a hierarchical tree structure, with a root value and subtrees of children with a parent node, represented as a set of linked nodes. The Huffman encoding may be combined with other encoding algorithms for additional compression (e.g., Lempel-Ziv based algorithms), such as in the Deflate compression scheme.

Regardless, to increase the speed of decompressing the data, a managed node 1260, in the illustrative embodiment, may parse a header of the compressed data to determine the variable size codes present in the compressed data and their corresponding symbols. The managed node 1260 may then identify the size of the smallest variable size code, deterministically decode a variable size code at a present position in the compressed data, and concurrently (e.g., in the same clock cycle) speculatively decode multiple subsequent variable size codes in the compressed data over a range on positions based on the identified size of the smallest variable size code (e.g., the present position, plus the size of the smallest variable size code, plus different offsets). In the illustrative embodiment, once the size of the deterministically decoded variable size code is known (e.g., after decoding), the managed node 1260 may determine whether the position of the next variable size code is within the range (e.g., the offsets from the present position) of the speculatively decoded codes. If so, the managed node 1260, in the illustrative embodiment, may output both the symbol associated with the deterministically decoded code and the symbol associated with the speculative decoded code located at the next position in the compressed data, thereby decreasing the latency in decompressing the data.

Figure 13:
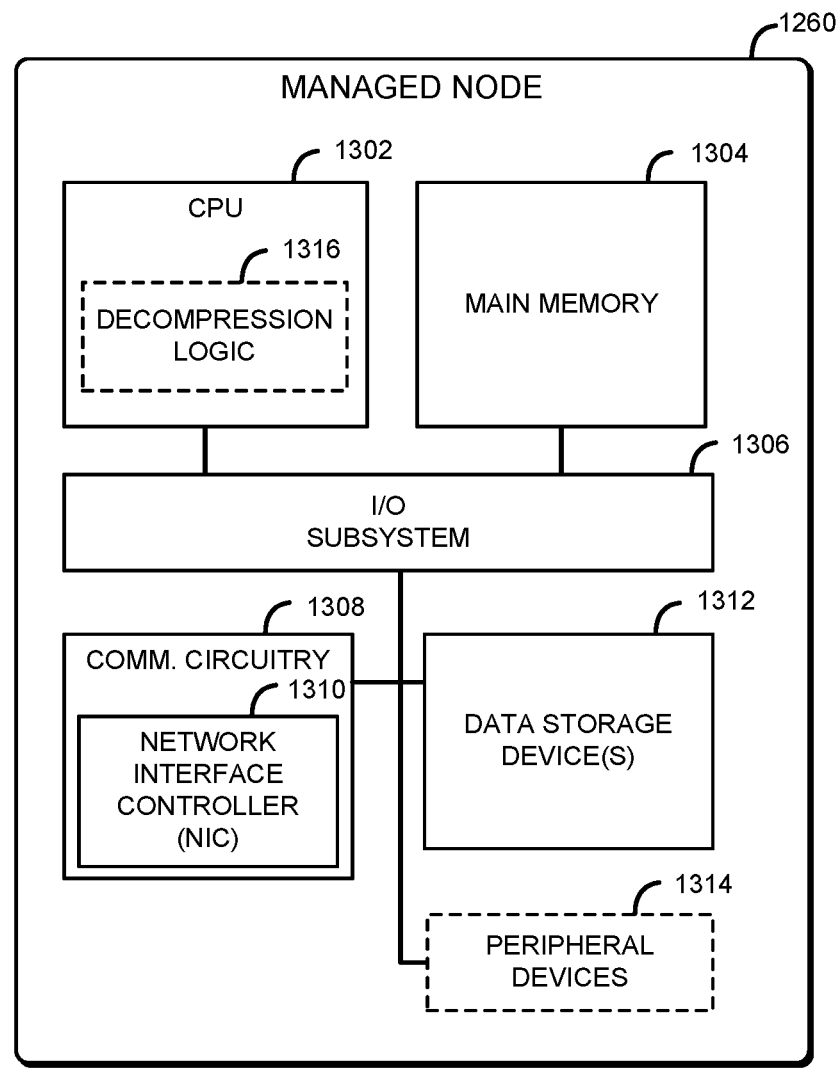
FIG. 13 is a simplified block diagram of at least one embodiment of a managed node of the system of FIG. 12.

Referring now to FIG. 13, the managed node 1250 in the set of managed nodes 1260 may be embodied as any type of compute device capable of performing the functions described herein, including decompressing data, compressing data, reading data, writing data, transmitting data, and performing workloads. For example, the managed node 1250 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative managed node 1260 includes a central processing unit (CPU) 1302, a main memory 1304, an input/output (I/O) subsystem 1306, communication circuitry 1308, and one or more data storage devices 1312. Of course, in other embodiments, the managed node 1250 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1302 may include specialized decompression logic 1316, which may be embodied as any circuitry or device capable of offloading, from the other components of the CPU 1302, the deterministic decompression of data (e.g., decoding of a variable size code at a present position) and the speculative decompression of data (e.g., concurrent decoding of multiple potential variable size codes at positions after the present position in the compressed data). As discussed above, the managed node 1250 may include resources distributed across multiple sleds and in such embodiments, the CPU 1302 may include portions thereof located on the same sled or different sled.

The main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation, such as compressed data, speculative decompression data (e.g., identifications of ranges of positions where speculative decompression is performed, symbols corresponding to speculatively decompressed variable size codes, etc.), decompressed data, operating systems, applications, programs, libraries, and drivers. The managed node 1250 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the managed node 1250. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the managed node 1250, on a single integrated circuit chip.

The communication circuitry 1308 may be embodied as any communication circuit, device, or collection thereof, capable of enabling communications over the network 1230 between the managed node 1250 and another compute device (e.g., the orchestrator server 1240 and/or one or more other managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughter-cards, network interface cards, controller chips, chipsets, or other devices that may be used by the managed node 1250 to connect with another compute device (e.g., the orchestrator server 1240 and/or physical resources of one or more managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a processor (not shown) local to the NIC 1310. In such embodiments, the local processor of the NIC 1310 may be capable of performing one or more of the functions of the CPU 1302 described herein. As discussed above, the managed node 1250 may include resources distributed across multiple sleds and in such embodiments, the communication circuitry 1308 may include portions thereof located on the same sled or different sled.

The one or more illustrative data storage devices 1312, may be embodied as any type of devices configured for short-term or long-term storage of data such as, for example, solid-state drives (SSDs), hard disk drives, memory cards, and/or other memory devices and circuits. Each data storage device 1312 may include a system partition that stores data and firmware code for the data storage device 1312. Each data storage device 1312 may also include an operating system partition that stores data files and executables for an operating system. In the illustrative embodiment, each data storage device 1312 includes non-volatile memory. Non-volatile memory may be embodied as any type of data storage capable of storing data in a persistent manner (even if power is interrupted to the non-volatile memory). For example, in the illustrative embodiment, the non-volatile memory is embodied as Flash memory (e.g., NAND memory or NOR memory). In other embodiments, the non-volatile memory may be embodied as any combination of memory devices that use chalcogenide phase change material (e.g., chalcogenide glass), or other types of byte-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or Spin Transfer Torque (STT)-MRAM, multi-threshold level NAND memory, a resistive memory, anti-ferroelectric memory, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

Additionally, the managed node 1250 may include one or more peripheral devices 1314. Such peripheral devices 1314 may include any type of peripheral device commonly found in a compute device such as a display, speakers, a mouse, a keyboard, and/or other input/output devices, interface devices, and/or other peripheral devices.

The client device 1220, the orchestrator server 1240, and the other managed nodes 1260 may have components similar to those described in FIG. 13. The description of those components of the managed node 1250 is equally applicable to the description of components of the client device 1220, the orchestrator server 1240, and the other managed nodes 1260 and is not repeated herein for clarity of the description. Further, it should be appreciated that any of the client device 1220, the orchestrator server 1240, and the other managed nodes 1260 may include other components, sub-components, and devices commonly found in a computing device, which are not discussed above in reference to the managed node 1250 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 14:
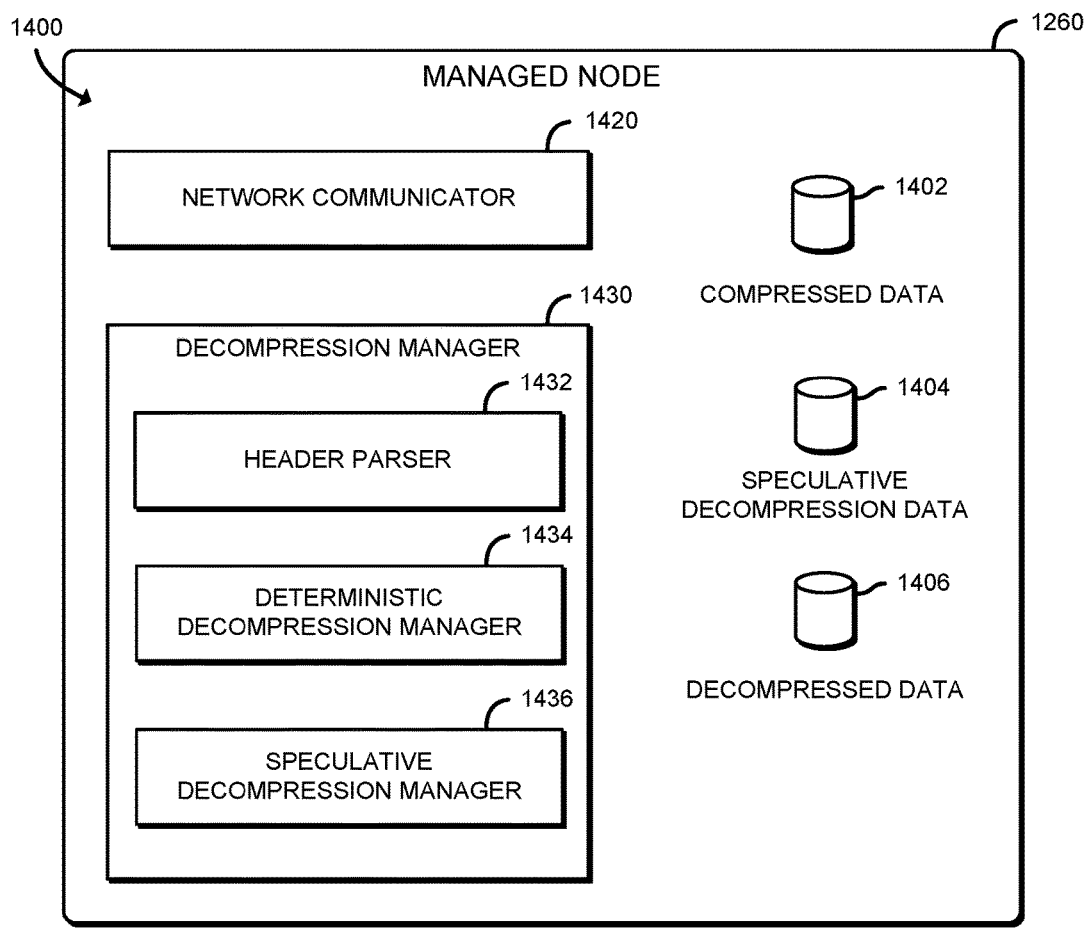
FIG. 14 is a simplified block diagram of at least one embodiment of an environment that may be established by a managed node of FIGS. 12 and 13.

Referring now to FIG. 14, in the illustrative embodiment, the managed node 1250 may establish an environment 1400 during operation. The illustrative environment 1400 includes a network communicator 1420 and a decompression manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, decompression manager circuitry 1430, etc.). It should be appreciated that, in such embodiments, one or more of the network communicator circuitry 1420 or the decompression manager circuitry 1430 may form a portion of one or more of the CPU 1302, the decompression logic 1316, the main memory 1304, the communication circuitry 1308, the I/O subsystem 1306, and/or other components of the managed node 1250.

In the illustrative embodiment, the environment 1400 includes compressed data 1402 which may be embodied as any data compressed with entropy encoding (e.g., Huffman encoding, Huffman encoding in combination with another compression scheme such as a Lempel-Ziv compression scheme, a Deflate compression scheme, etc.). The data may have been received from another device (e.g., the client device 1220, the orchestrator server 1240, one or more resources of another managed node 1260) or generated by the present managed node 1260. The compressed data 1402 may be embodied as a collection of different files or streams of different types of data, such as text data, image data, and/or audio data. The compressed data may be compressed with literal-length trees (LL-trees) and distance trees (D-trees), such as data encoded with the Deflate compression scheme. In the illustrative embodiment, the LL-trees may be embodied as any data indicative of codes associated with literal symbols and length symbols, in which the more frequently occurring literal or length symbols have smaller codes (fewer bits) and the less frequently occurring literal or length symbols have larger codes (more bits). Similarly, the D-trees may be embodied as any data indicative of codes associated with distance symbols, in which the more frequently occurring distance symbols have smaller codes and the less frequently occurring symbols have larger codes. In such embodiments, the data is compressed with literal bytes, represented by literal symbols, and pointers to replicated strings, in which each pointer is a pair of a length of bytes to read (i.e., a length symbol) and a backward distance offset (i.e., a distance offset indicative of a number of bytes from the previous occurrence of the replicated string). The environment 1400, in the illustrative embodiment, additionally includes speculative decompression data 1404, which may be embodied as any data indicative of the range of positions in a compressed data set where variable size codes are decoded concurrently with a variable size code at the present position in the compressed data 1402, and the symbols corresponding to the speculatively decompressed codes. Additionally, in the illustrative embodiment, the environment 1400 includes decompressed data 1406 which may be embodied as any data that has been decompressed from the compressed data 1402.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the managed node 1250. To do so, the network communicator 1420 is configured to receive and process data packets from one system or computing device (e.g., the orchestrator server 1240, a managed node 1260, etc.) and to prepare and send data packets to another computing device or system (e.g., another managed node 1260). Accordingly, in some embodiments, at least a portion of the functionality of the network communicator 1420 may be performed by the communication circuitry 1308, and, in the illustrative embodiment, by the NIC 1310.

The decompression manager 1430, which may be embodied as hardware, firmware, software, virtualized hardware, emulated architecture, and/or a combination thereof as discussed above, is configured to manage the deterministic and speculative decompression of the compressed data 1402. To do so, in the illustrative embodiment, the decompression manager 1430 includes a header parser 1432, a deterministic decompression manager 1434, and a speculative decompression manager 1436. The header parser 1432, in the illustrative embodiment, is configured to parse a header or similar section of a set of compressed data 1402 to determine the set of variable sized codes and the corresponding symbols, such as by parsing one or more tree descriptors in the compressed data 1402. The deterministic decompression manager 1434, in the illustrative embodiment, is configured to identify a variable size code at the present position in the compressed data, output the symbol corresponding to the variable size code, and advance the present position to a subsequent position in the compressed data 1402. In decoding the variable size code at the present position, the deterministic decompression manager 1434 may select from among multiple types of decoders or sets of variable size codes and corresponding symbols, as a function of the symbol corresponding to the previously decoded variable size code. For example, if the previous symbol was a length symbol, then deterministic decompression manager 1434 may select the set of variable size codes and corresponding symbols for distance symbols, or select dedicated distance decoder logic (e.g., specialized circuitry), to decode the variable size code at the present position.

The speculative decompression manager 1436, in the illustrative embodiment, is configured to determine the symbol associated with the variable size code at each of multiple positions after the present position, while the variable size code at the present position is being decoded. In the illustrative embodiment, the speculative decompression manager 1436 decodes a variable size code at one position calculated by adding the size of the smallest variable size code to the present position. Further, in the illustrative embodiment, speculative decompression manager 1436 decodes variable size codes at multiple other positions in the range at further offsets (e.g., one, two, three, etc.) in the compressed data 1402. In doing so, for each position in the range, the speculative decompression manager 1436 may use multiple types of decoders (e.g., specialized circuitry for distance symbols, specialized circuitry for LL-symbols, etc.) in parallel and select the output of one of the decoders when the variable size code at the present position and the type of the corresponding symbol (e.g., distance symbol, literal symbol, length symbol) has been determined by the deterministic decompression manager 1434. If the range does not cover the position of the next variable size code (e.g., the next variable size code is at a position beyond the speculatively decoded codes), the decompression manager 1430, in the illustrative embodiment, discards the results of the speculative decodes. Otherwise, the decompression manager 1430 adds the symbol associated with the speculatively decoded code at the next position to the decompressed data 1406.

It should be appreciated that each of the header parser 1432, the deterministic decompression manager 1434, and speculative decompression manager 1436 may be separately embodied as hardware, firmware, software, virtualized hardware, emulated architecture, and/or a combination thereof and may be distributed across multiple sleds. For example, the header parser 1432 may be embodied as a hardware component, while the deterministic decompression manager 1434 and the speculative decompression manager 1436 are embodied as virtualized hardware components or as some other combination of hardware, firmware, software, virtualized hardware, emulated architecture, and/or a combination thereof.

Figure 15:
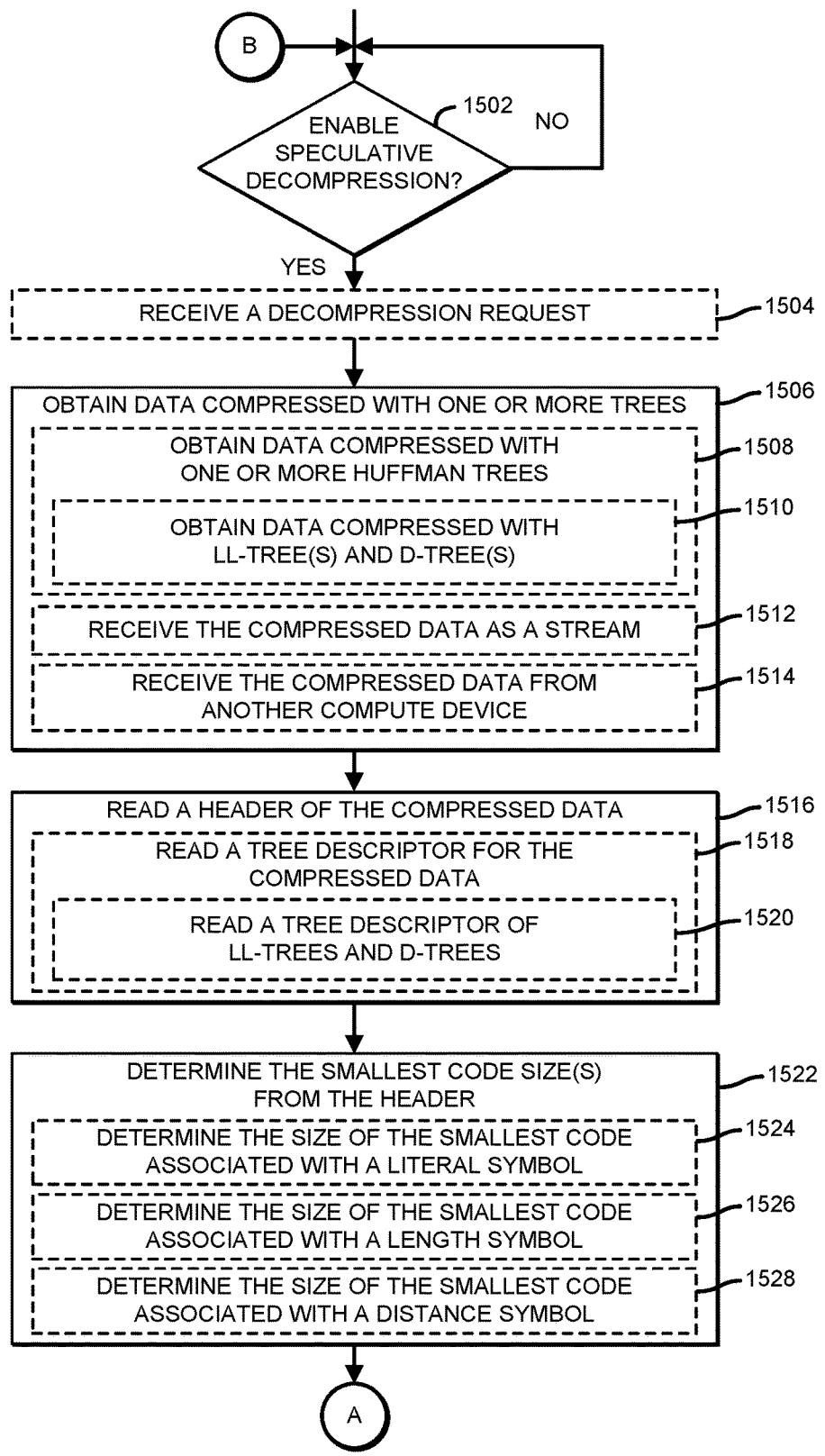
FIGS. 15-18 are a simplified flow diagram of at least one embodiment of a method for performing speculative decompression that may be performed by a managed node of FIGS. 12-14.

Referring now to FIG. 15, in use, the managed node 1250 may execute a method 1500 for performing speculative decompression of data. The method 1500 begins with block 1502, in which the managed node 1250 determines whether to enable speculative decompression of data. In the illustrative embodiment, the managed node 1250 may determine to enable speculative decompression of data if the managed node 1250 is powered on and has detected that the decompression logic 1316 is present. In other embodiments, the managed node 1250 may determine to enable speculative decompression of data based on other factors. Regardless, in response to a determination to enable speculative decompression of data, the method 1500 advances to block 1504 in which the managed node 1250 may receive a decompression request (i.e., a request to decompress data), such as from another resource of the managed node 1250 (e.g., from a physical compute resource 205-4, a physical storage resource 205-1) or from another compute device (e.g., the orchestrator server 1240, the client device 1220, etc.).

In block 1506, the managed node 1250 obtains data compressed with one or more trees (e.g., the compressed data 1402). The trees may be embodied as any data indicative of codes associated with symbols in the data and in which more frequently occurring symbols have shorter codes than less frequently occurring symbols. In obtaining the data, in the illustrative embodiment, the managed node 1250 obtains data compressed with one or more Huffman trees, as indicated in block 1508. Further, in the illustrative embodiment and as indicated in block 1510, in obtaining the data compressed with one or more Huffman trees, the managed node may obtain data compressed with one or more literal-length trees (LL-trees) and distance trees (D-trees), such as data encoded with the Deflate compression scheme. In the illustrative embodiments, the LL-trees may be embodied as any data indicative of codes associated with literal symbols and length symbols, in which the more frequently occurring literal or length symbols have shorter codes and the less frequently occurring literal or length symbols have longer codes. Similarly, the D-trees may be embodied as any data indicative of codes associated with distance symbols, in which the more frequently occurring distance symbols have shorter codes and the less frequently occurring symbols have longer codes. As indicated in block 1512, the managed node 1250 may receive the compressed data 1402 in a stream. Further, as indicated in block 1514, the managed node 1250 may receive the compressed data 1402 from another compute device (e.g., the client device 1220, the orchestrator server 1240, etc.). In other embodiments, the managed node 1250 may obtain the compressed data 1402 from one of its own resources (e.g., one or more physical storage resources 205-1 and/or one or more physical memory resources 205-3).

Subsequently, in block 1516, the managed node 1250 reads a header of the compressed data 1402. The header may be embodied as any section of the compressed data that includes descriptive information about the content of the compressed data 1402. In the illustrative embodiment, the header precedes the series of variable size codes representative of the symbols (e.g., letters, numbers, etc.) in the uncompressed form of the data. In reading the header, as indicated in block 1518, the managed node 1250 may read and parse a tree descriptor for the compressed data 1402. As described above, a tree descriptor may be embodied as any data indicative of associations between variable size codes present in the compressed data and corresponding symbols. In reading and parsing the tree descriptor, the managed node 1250 may read and parse a tree descriptor of the one or more LL-trees and D-trees, as indicated in block 1520.

Subsequently, in block 1522, the managed node 1250 determines the smallest code size from the header that was read in block 1516. The smallest code size is positioned before the larger code sizes in the header. As described above, for a given set of symbols, the symbol that appears most frequently in the decompressed form of the data is associated with the smallest sized code (e.g., fewest number of bits) in the compressed data 1402, while the less frequent symbols are associated with larger codes (e.g., more bits). As indicated in block 1524, the managed node 1250 may determine the size of the smallest code associated with a literal symbol, as indicated in block 1524. Additionally or alternatively, the managed node 1250 may determine the size of the smallest code associated with a length symbol, as indicated in block 1526. In some embodiments, the variable sized codes for the literal and length symbols are included in the same tree descriptor (e.g., an LL-tree descriptor). Additionally or alternatively, the managed node 1250 may determine the size of the smallest code (e.g., by counting the number of bits in the code and comparing to the sizes of the other codes) associated with a distance symbol, as indicated in block 1528. In the illustrative embodiment, the variable size codes associated with distance symbols are defined in a D-tree, as described above. In some embodiments, the managed node 1250 may determine the size of a variable size code as the size of the code itself plus the size of extra bits that follow the code. For example, a particular variable size code may correspond with a symbol that represents a range of numeric values, and a set of extra bits that typically follow the variable size code may indicate an index within that range. Accordingly, in some embodiments, the managed node 1250 may calculate the size of the variable sized code as the combined size of variable size code and the extra bits. Subsequently, the method 1500 advances to block 1530, in which the managed node 1250 determines whether there is compressed data 1402 to be decompressed, such as by determining whether the managed node 1250 has reached the end of the compressed data 1402 (e.g., the end of the file or stream).

Figure 16:
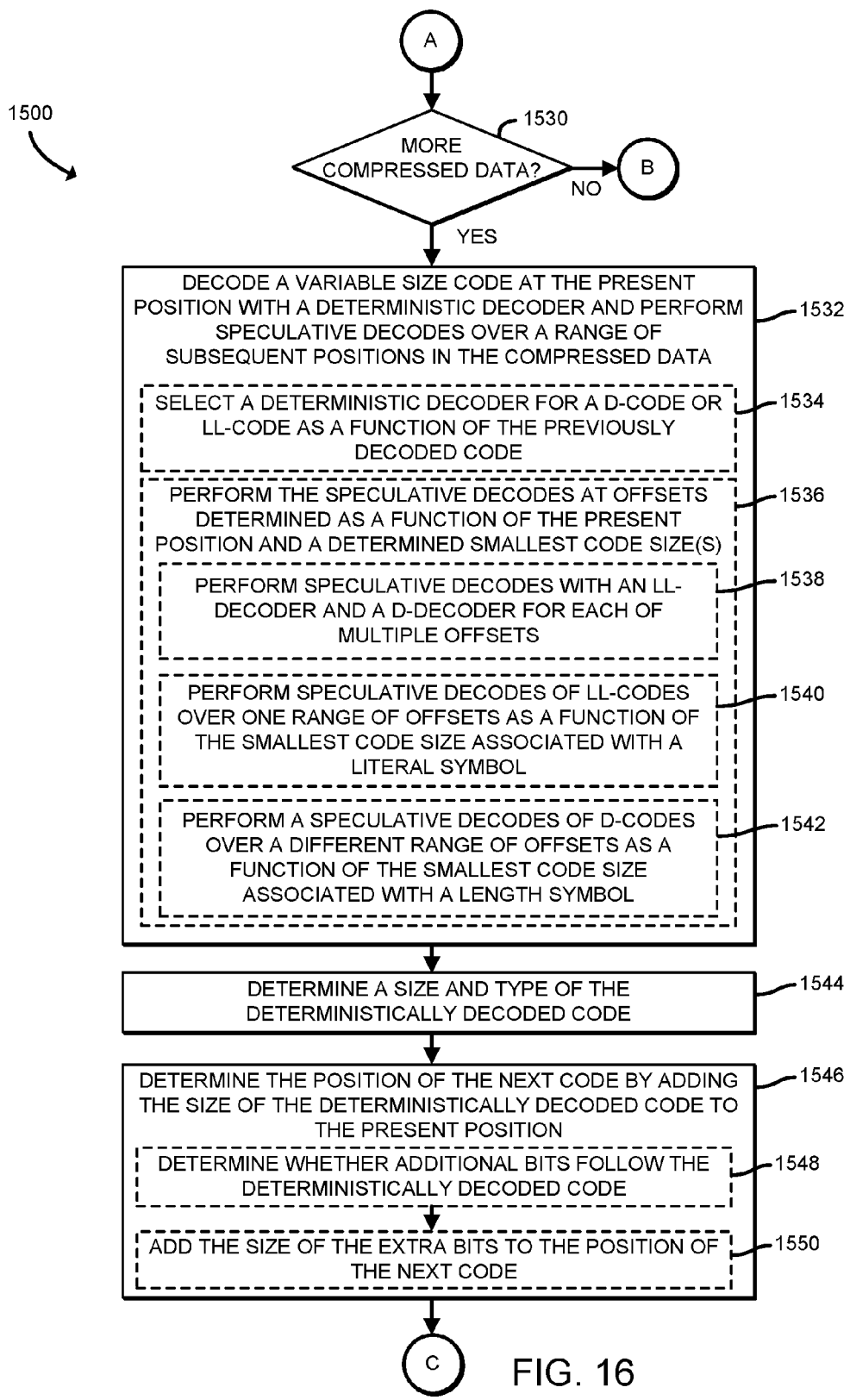

Referring now to FIG. 16, given that the managed node 1250 has not yet decompressed any of the compressed data 1402, the managed node 1250 may initially determine that compressed data 1402 is available to be decompressed. Otherwise, the method 1500 loops back to block 1502 of FIG. 15 in which the managed node 1250 determines whether to continue to enable speculative decompression. Referring back to block 1530, in response to a determination that the compressed data 1402 is available to be decompressed, the method 1500 advances to block 1532 in which the managed node 1250 decodes a variable size code at the present position in the compressed data 1402 with a deterministic decoder and concurrently performs speculative decodes over a range of subsequent positions in the compressed data 1402. In doing so, as indicated in block 1534, the managed node 1250 may select a deterministic decoder (e.g., specialized circuitry in the decompression logic 1316) for a D-code (e.g., a variable size code associated with a distance symbol) or a deterministic decoder for an LL-code (e.g., a variable size code associated with a literal symbol or a length symbol) as a function of the previously decoded variable size code. In the illustrative embodiment, a variable size code for a literal symbol may be followed by another variable size code for a literal symbol or a length symbol. Conversely, a variable size code for a length symbol is, in the illustrative embodiment, always followed by a variable size code for a distance symbol. Further, in the illustrative embodiment, a variable size code for a distance symbol may be followed by a variable size code for a literal symbol or a length symbol, but not by a variable size code for another distance symbol. Accordingly, in the illustrative embodiment, the managed node 1250 may select an LL-decoder and/or a D-decoder to decode the present variable size code based on the type of the previously decoded variable size code in the compressed data 1402.

In block 1536, the managed node 1250 may concurrently and in parallel perform the speculative decodes at offsets determined as a function of the present position in the compressed data 1402 and one or more smallest code sizes determined in block 1522 of FIG. 15. In doing so, the managed node 1250 may perform speculative decodes with an LL-decoder and a D-decoder for each of multiple offsets, as indicated in block 1538. For example, a speculative LL-decoder and a corresponding D-decoder may perform decodes of a variable size code at the present position plus the size of the smallest code determined in block 1522. Another speculative LL-decoder and a corresponding D-decoder may perform decodes of a variable size code at the present position plus the size of the smallest code determined in block 1522, plus one. Further, another speculative LL-decoder and a corresponding D-decoder may perform decodes of a variable size code at the present position plus the size of the smallest code determined in block 1522, plus two, and so on. As indicated in block 1540, the managed node 1250 may perform speculative decodes of LL-codes (e.g., variable size codes corresponding to literal symbols and length symbols) over one range of offsets as a function of the smallest code size associated with a literal symbol (e.g., the smallest code size determined at block 1524 of FIG. 15). Additionally, the managed node 1250 may perform speculative decodes of D-codes (e.g., variable size codes corresponding to distance symbols) over a different range of offsets as a function of the smallest code size associated with a length symbol), as indicated in block 1542. In some embodiments, the decompression logic 1316 may include more speculative D-decoders than LL-decoders and, as such, may perform more speculative decodes of potential distance symbols (e.g., over a larger range) than speculative decodes of potential literal or length symbols while the deterministic decoder is decoding the variable size code at the present position.

In block 1544, the managed node 1250 determines a size and types of the deterministically decoded code at the present position. Subsequently, in block 1546, the managed node 1250 determines the position of the next variable size code by adding the size of the deterministically decoded variable size code (e.g., from block 1544) to the present position. In doing so, as indicated in block 1548, the managed node 1250 may determine whether additional bits follow the deterministically decoded code at the present position. For example, in some embodiments, if the deterministically decoded code is for a length symbol with a value greater than ten, or for a distance symbol with a value greater than four, the value of the variable size code represents a range of values, and the additional bits specify the position within the range. As such, a variable size code for a length symbol with a value between 17 and 24 may be followed by additional bits indicative of the index of the actual value within the range of 17 to 24. Similarly, a variable size code for a distance symbol with a value between 19 and 22 may be followed by additional bits indicative of the index of the actual value within the range of 19 to 22. If the additional bits are present, the managed node 1250 adds the size of the extra bits to the position of the next code, as indicated in block 1550. Subsequently, the method 1500 advances to block 1552 of FIG. 17, in which the managed node 1250 determines whether the position of the next variable size code is within the range of the speculative decodes from block 1532.

Figure 17:
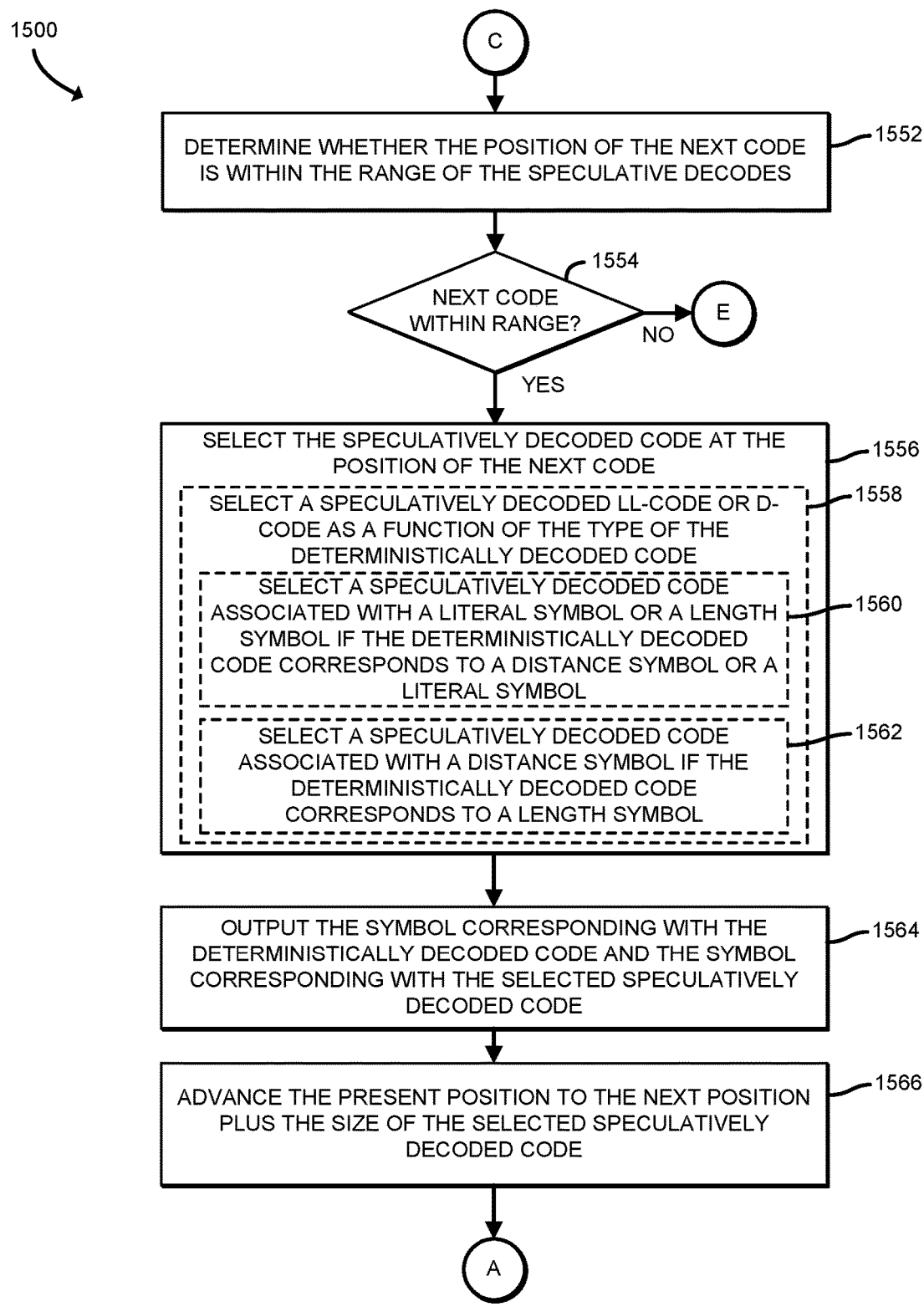

Referring now to FIG. 17, the managed node 1250 determines the subsequent operations to perform based on whether the next variable size code is at a position within the range of the speculative decodes, as indicated in block 1554. If the position of the next code is within the range, the method 1500 advances to block 1556, in which the managed node selects the speculatively decoded variable size code at the position of the next code (e.g., the managed node 1250 selects the output of a speculative decoder assigned to the variable size code at the position of the next code). In doing so, the managed node 1250 may select a speculatively decoded LL-code (e.g., a variable size code associated with a literal symbol or a length symbol) or may select a speculatively decoded D-code (e.g., a variable size code associated with a distance symbol) as a function of the type of the deterministically decoded code, as indicated in block 1558. In doing so, in the illustrative embodiment, the managed node 1250 may select a speculatively decoded code associated with a literal symbol or a length symbol if the deterministically decoded code corresponds to a distance symbol or a literal symbol, as indicated in block 1560. Otherwise, and as indicated in block 1562, the managed node 1250 may select a speculatively decoded code associated with a distance symbol if the deterministically decoded code corresponds to a length symbol. Subsequently, the method 1500 advances to block 1564 in which the managed node 1250 outputs the symbol corresponding with the deterministically decoded code and the symbol corresponding with the selected speculatively decoded code. Subsequently, as indicated in block 1566, the managed node 1250 advances the present position to the position of the next code, determined in block 1546 plus the size of the speculatively decoded code. Subsequently, the method 1500 loops back to block 1530 of FIG. 16 to determine whether there is more compressed data 1402 to be decompressed. Referring back to block 1554, if the managed node 1250 instead determines that the position of the next code is not within the range of the speculative decodes, the method 1500 advances to block 1568 of FIG. 18, in which the managed node 1250 discards the results of the speculative decodes.

Figure 18:
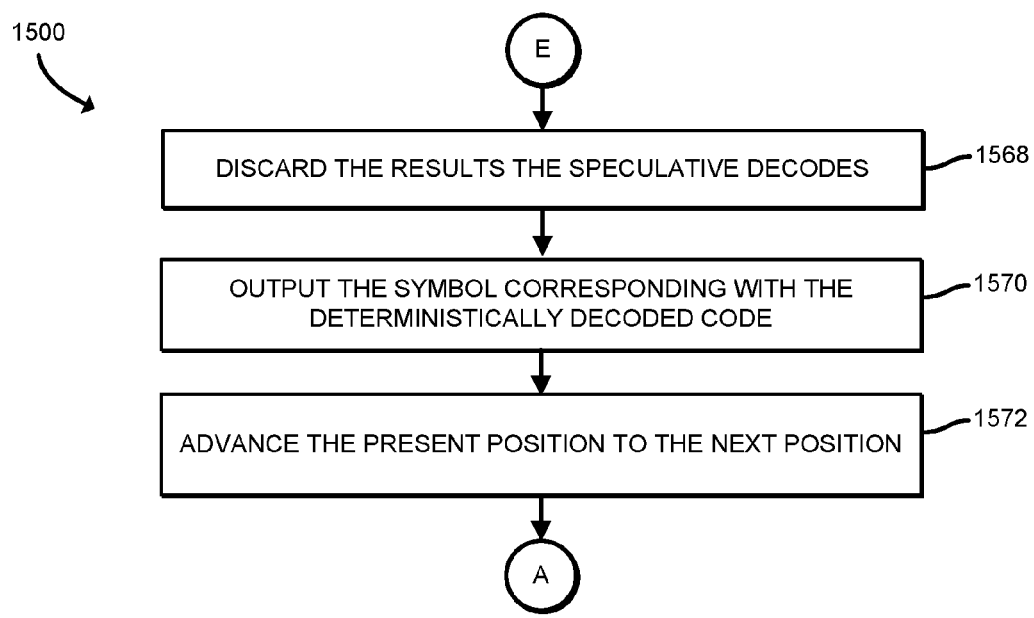

Referring now to FIG. 18, after the managed node 1250 discards the results of the speculative decodes, the managed node 1250 outputs the symbol corresponding with the deterministically decoded code, as indicated in block 1570. Subsequently, as indicated in block 1572, the managed node 1250 advances the present position to the position of the next code determined in block 1546 of FIG. 16. Afterwards, the method 1500 loops back to block 1530 of FIG. 16, in which the managed node 1250 determines whether there is more compressed data 1402 to be decompressed.

Figure 19:
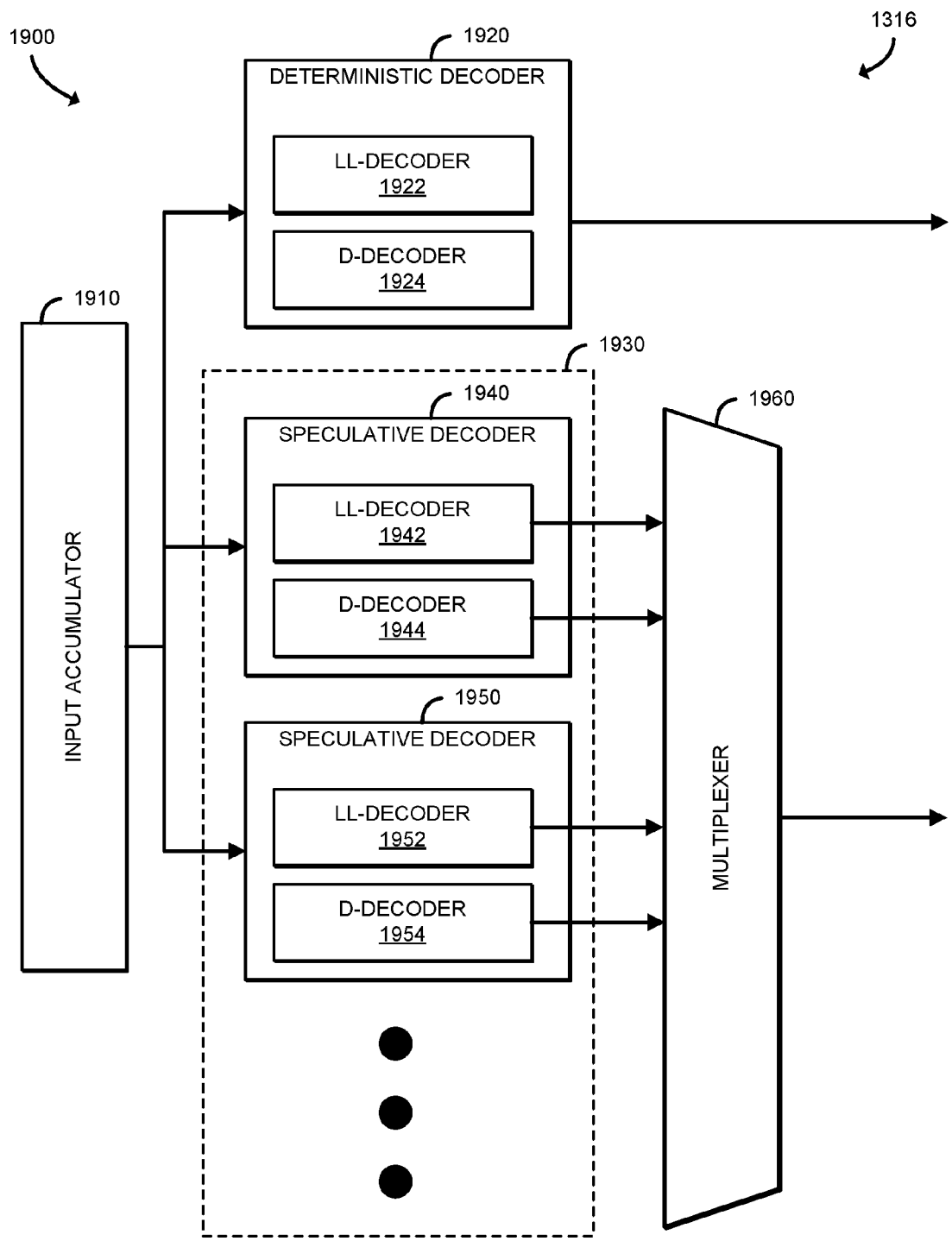
FIG. 19 is a simplified block diagram of at least one embodiment of decompression logic that may be included in the managed node of FIGS. 12 and 13.

Referring now to FIG. 19, an embodiment 1900 of the decompression logic 1316 includes an input accumulator 1910 which may be embodied as any device or circuitry capable of reading the compressed data 1402. The input accumulator 1910 is in communication with a deterministic decoder 1920, which may be embodied as any device or circuitry capable of decoding the variable size code at the present position in the compressed data 1402. In the illustrative embodiment, the deterministic decoder 1920 includes an LL-decoder 1922 which may be embodied as any device or circuitry capable of decoding a variable size code corresponding to a literal symbol or a length symbol. Additionally, in the illustrative embodiment, the deterministic decoder 1920 includes a D-decoder 1924, which may be embodied as any device or circuitry capable of decoding a variable size code corresponding to a distance symbol. The decompression logic 1316 may select from the LL-decoder 1922 or the D-decoder 1924 to decode the variable size code at the present position as a function of the type of the variable size code that was decoded at the previous position, as described above with reference to block 1534 of FIG. 16.

The input accumulator 1910 is also in communication with a set of speculative decoders 1930. Each speculative decoder 1930 may be embodied as any device or circuitry capable of decoding a variable size code at a subsequent position in the compressed data, concurrently (e.g., in the same clock cycle) with the decoding of the variable size code at the present position by the deterministic decoder 1920. The speculative decoders 1930 include speculative decoders 1940, 1950. The speculative decoder 1940 includes an LL-decoder 1942 which may be embodied as any device or circuitry capable of decoding a variable size code corresponding to a literal symbol or a length symbol. Additionally, in the illustrative embodiment, the speculative decoder 1940 includes a D-decoder 1944, which may be embodied as any device or circuitry capable of decoding a variable size code corresponding to a distance symbol. The speculative decoder 1950 includes an LL-decoder 1952, similar to the LL-decoder 1942, and a D-decoder 1954, similar to the D-decoder 1944. While two speculative decoders 1940, 1950 are shown in the set, it should be understood that the set may include a different number of speculative decoders 1930. The speculative decoders 1930 are in communication with a multiplexer 1960 which may be embodied as any device or circuitry capable of selecting an output of the speculative decoders 1930 to be added to the decompressed data 1406, if the speculative decodes are within a range that includes the position of the next variable size code, as described above with reference to blocks 1552 through 1564 of FIG. 17. As such, the input stream (e.g., the compressed data 1402) is input in parallel to the deterministic decoder 1920 and to the speculative decoders 1930 (e.g., the speculative decoders 1940, 1950, etc.) with one of the outputs from the speculative decoders 1930 potentially being selected by the multiplexor 1960.

Figure 20:
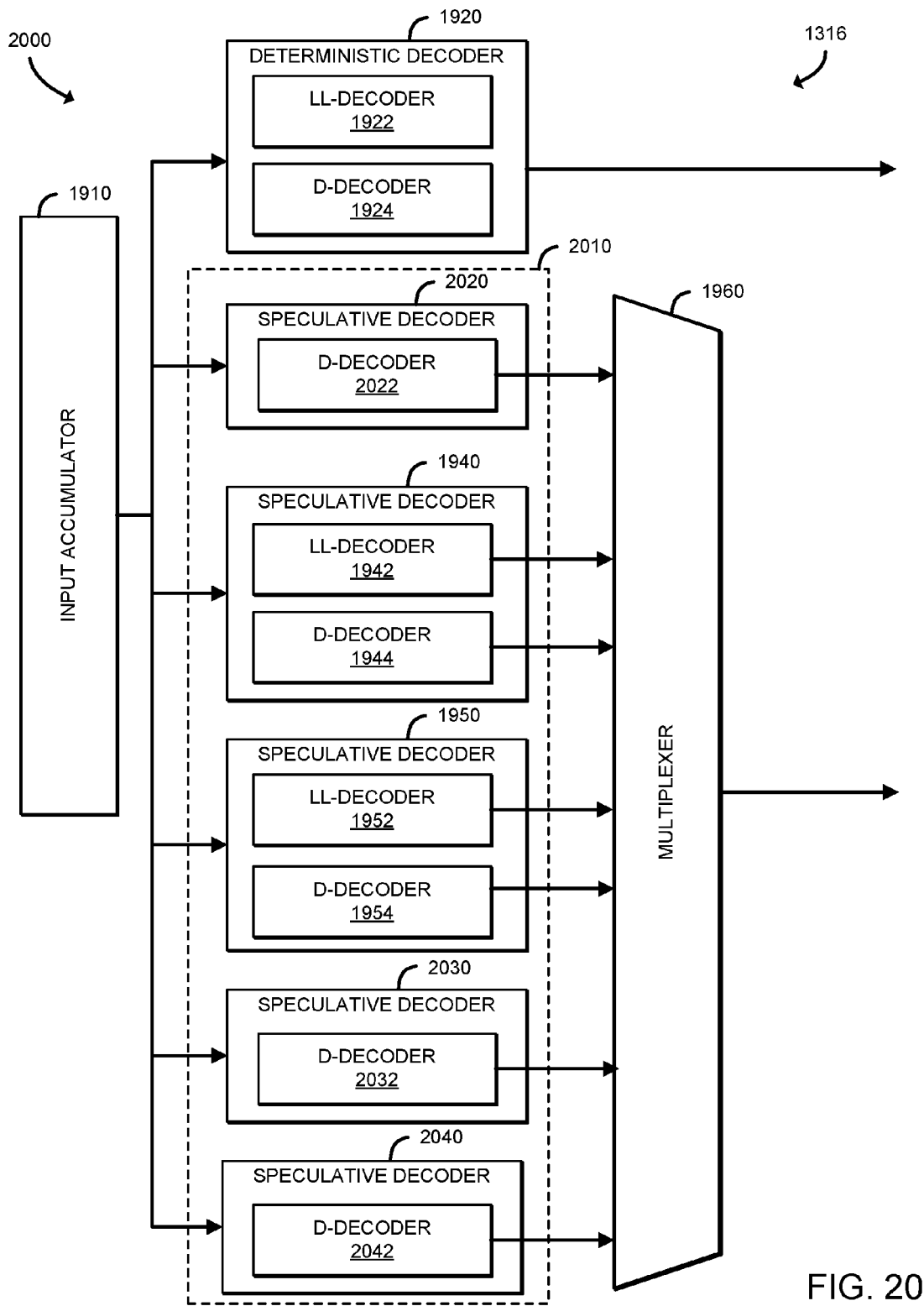
FIG. 20 is a simplified block diagram of another embodiment of decompression logic that may be included in the managed node of FIGS. 12 and 13.

Referring now to FIG. 20, another embodiment 2000 of the decompression logic 1316 includes the input accumulator 1910, the deterministic decoder 1920, and a set of speculative decoders 2010. The set of speculative decoders 2010 includes the speculative decoders 1940, 1950 and multiple other speculative decoders 2020, 2030, and 2040 that each include a corresponding D-decoder 2022, 2032, 2042 without a corresponding LL-decoder. The D-decoders may be smaller than the LL-decoders and, as such, the decompression logic 1316 may include more D-decoders than LL-decoders in the set 2010.

EXAMPLES

Illustrative examples of the technologies disclosed herein are provided below. An embodiment of the technologies may include any one or more, and any combination of, the examples described below.

Example 1 includes a managed node for speculatively decompressing data, the managed node comprising a deterministic decoder; one or more speculative decoders; and a decompression manager to decode a variable size code at a present position in compressed data with the deterministic decoder and concurrently perform speculative decodes over a range of subsequent positions in the compressed data with the one or more speculative decoders, wherein the subsequent positions are determined as a function of the present position and a determined smallest code size; determine the position of the next code by adding a size of the deterministically decoded code to the present position; determine whether the position of the next code is within the range; and output, in response to a determination that the position of the next code is within the range, a first symbol associated with the deterministically decoded code and a second symbol associated with a speculatively decoded code at the position of the next code.

Example 2 includes the subject matter of Example 1, and wherein the decompression manager is further to output, in response to a determination that the position of the next code is not within the range, the first symbol without a second symbol.

Example 3 includes the subject matter of any of Examples 1 and 2, and wherein the decompression manager is further to obtain the compressed data, wherein the compressed data is compressed with one or more trees; read a header of the compressed data, wherein the header includes a tree descriptor indicative of variable size codes associated with symbols in the compressed data; and determine the size of the smallest variable size code from the header.

Example 4 includes the subject matter of any of Examples 1-3, and wherein to obtain the compressed data comprises to obtain data compressed with one or more Huffman trees.

Example 5 includes the subject matter of any of Examples 1-4, and wherein to obtain the compressed data comprises to obtain data compressed with a literal-length tree indicative of codes that correspond with literal symbols and length symbols, and a distance tree indicative of codes that correspond with distance symbols.

Example 6 includes the subject matter of any of Examples 1-5, and wherein to read the header of the compressed data comprises to read a header that includes a tree descriptor of a literal-length tree indicative of codes that correspond to literal symbols and length symbols and of a distance tree indicative of codes that correspond with distance symbols.

Example 7 includes the subject matter of any of Examples 1-6, and wherein to determine the size of the smallest variable size code comprises to determine one or more of a size of the smallest code associated with a literal symbol, a size of the smallest code associated with a length symbol, or a size of the smallest code associated with a distance symbol.

Example 8 includes the subject matter of any of Examples 1-7, and wherein the deterministic decoder comprises a distance decoder and a literal-length decoder, and to decode the variable size code at a present position with the deterministic decoder comprises to select, as a function of a previously decoded code, one of the distance decoder or the literal-length decoder to perform the decode at the present position.

Example 9 includes the subject matter of any of Examples 1-8, and wherein to perform the speculative decodes over the range of subsequent positions comprises to perform speculative decodes with literal-length decoders and distance decoders for multiple offsets from the present position in the compressed data.

Example 10 includes the subject matter of any of Examples 1-9, and wherein to perform the speculative decodes over the range of subsequent positions comprises to perform speculative decodes with literal-length decoders over one range of offsets from the present position and with distance decoders over a different range of offsets from the present position.

Example 11 includes the subject matter of any of Examples 1-10, and wherein to perform the speculative decodes with literal-length decoders over one range of offsets comprises to perform speculative decodes of codes associated with literal symbols and length symbols over a range of offsets determined as a function of the smallest code size associated with a literal symbol.

Example 12 includes the subject matter of any of Examples 1-11, and wherein to perform the speculative decodes with distance decoders over the different range of offsets comprises to perform speculative decodes of codes associated with distance symbols over a range of offsets determined as a function of the smallest code size associated with a length symbol.

Example 13 includes the subject matter of any of Examples 1-12, and wherein to determine the position of the next code further comprises to determine whether additional bits indicative of a value within a range associated with the deterministically decoded code are present; and add, in response to a determination that the additional bits are present, the size of the additional bits to the position of the next code. 14. The managed node of claim 2, wherein the decompression manager is further to select a speculatively decoded code associated with a literal symbol, a length symbol, or a distance symbol as a function of a type of the deterministically decoded code.

Example 15 includes the subject matter of any of Examples 1-14, and wherein to select the speculatively decoded code comprises to select, in response to a determination that the deterministically decoded symbol is associated with a length symbol, a speculatively decoded code associated with a distance symbol.

Example 16 includes a method for speculatively decompressing data, the method comprising decoding, by a managed node, a variable size code at a present position in the compressed data with a deterministic decoder and concurrently performing speculative decodes over a range of subsequent positions in the compressed data with one or more speculative decoders, wherein the subsequent positions are determined as a function of the present position and the determined smallest code size; determining, by the managed node, the position of the next code by adding a size of the deterministically decoded code to the present position; determining, by the managed node, whether the position of the next code is within the range; and outputting, by the managed node and in response to a determination that the position of the next code is within the range, a first symbol associated with the deterministically decoded code and a second symbol associated with a speculatively decoded code at the position of the next code.

Example 17 includes the subject matter of Example 16, and further including obtaining, by the managed node, the compressed data, wherein the compressed data is compressed with one or more trees; reading, by the managed node, a header of the compressed data, wherein the header includes a tree descriptor indicative of variable size codes associated with symbols in the compressed data; and determining, by the managed node, a size of the smallest variable size code from the header.

Example 18 includes the subject matter of any of Examples 16 and 17, and further including outputting, by the managed node and in response to a determination that the position of the next code is not within the range, the first symbol without a second symbol.

Example 19 includes the subject matter of any of Examples 16-18, and wherein obtaining the compressed data comprises obtaining data compressed with one or more Huffman trees.

Example 20 includes the subject matter of any of Examples 16-19, and wherein obtaining the compressed data comprises obtaining data compressed with a literal-length tree indicative of codes that correspond with literal symbols and length symbols, and a distance tree indicative of codes that correspond with distance symbols.

Example 21 includes the subject matter of any of Examples 16-20, and wherein reading the header of the compressed data comprises reading a header that includes a tree descriptor of a literal-length tree indicative of codes that correspond to literal symbols and length symbols and of a distance tree indicative of codes that correspond with distance symbols.

Example 22 includes the subject matter of any of Examples 16-21, and wherein determining the size of the smallest variable size code comprises determining one or more of a size of the smallest code associated with a literal symbol, a size of the smallest code associated with a length symbol, or a size of the smallest code associated with a distance symbol.

Example 23 includes the subject matter of any of Examples 16-22, and wherein decoding the variable size code at a present position with the deterministic decoder comprises selecting, as a function of a previously decoded code, one of a distance decoder or a literal-length decoder included in the deterministic decoder to perform the decode at the present position.

Example 24 includes the subject matter of any of Examples 16-23, and wherein performing the speculative decodes over the range of subsequent positions comprises performing speculative decodes with literal-length decoders and distance decoders for multiple offsets from the present position in the compressed data.

Example 25 includes the subject matter of any of Examples 16-24, and wherein performing the speculative decodes over the range of subsequent positions comprises to perform speculative decodes with literal-length decoders over one range of offsets from the present position and with distance decoders over a different range of offsets from the present position.

Example 26 includes the subject matter of any of Examples 16-25, and wherein performing the speculative decodes with literal-length decoders over one range of offsets comprises performing speculative decodes of codes associated with literal symbols and length symbols over a range of offsets determined as a function of the smallest code size associated with a literal symbol.

Example 27 includes the subject matter of any of Examples 16-26, and wherein performing the speculative decodes with distance decoders over the different range of offsets comprises performing speculative decodes of codes associated with distance symbols over a range of offsets determined as a function of the smallest code size associated with a length symbol.

Example 29 includes the subject matter of any of Examples 16-28, and further including selecting, by the managed node, a speculatively decoded code associated with a literal symbol, a length symbol, or a distance symbol as a function of a type of the deterministically decoded code.

Example 30 includes the subject matter of any of Examples 16-29, and wherein selecting the speculatively decoded code comprises selecting, in response to a determination that the deterministically decoded symbol is associated with a length symbol, a speculatively decoded code associated with a distance symbol.

Example 31 includes one or more machine-readable storage media comprising a plurality of instructions stored thereon that, in response to being executed, cause a managed node to perform the method of any of Examples 16-30.

Example 32 includes a managed node for speculatively decompressing data, the managed node comprising means for decoding a variable size code at a present position in the compressed data with a deterministic decoder and concurrently performing speculative decodes over a range of subsequent positions in the compressed data with one or more speculative decoders, wherein the subsequent positions are determined as a function of the present position and the determined smallest code size; means for determining the position of the next code by adding a size of the deterministically decoded code to the present position; means for determining whether the position of the next code is within the range; and means for outputting, in response to a determination that the position of the next code is within the range, a first symbol associated with the deterministically decoded code and a second symbol associated with a speculatively decoded code at the position of the next code.

Example 33 includes the subject matter of Example 32, and further including means for obtaining the compressed data, wherein the compressed data is compressed with one or more trees; means for reading a header of the compressed data, wherein the header includes a tree descriptor indicative of variable size codes associated with symbols in the compressed data; and means for determining a size of the smallest variable size code from the header.

Example 34 includes the subject matter of any of Examples 32 and 33, and further including means for outputting, in response to a determination that the position of the next code is not within the range, the first symbol without a second symbol.

Example 35 includes the subject matter of any of Examples 32-34, and wherein the means for obtaining the compressed data comprises means for obtaining data compressed with one or more Huffman trees.

Example 36 includes the subject matter of any of Examples 32-35, and wherein the means for obtaining the compressed data comprises means for obtaining data compressed with a literal-length tree indicative of codes that correspond with literal symbols and length symbols, and a distance tree indicative of codes that correspond with distance symbols.

Example 37 includes the subject matter of any of Examples 32-36, and wherein the means for reading the header of the compressed data comprises means for reading a header that includes a tree descriptor of a literal-length tree indicative of codes that correspond to literal symbols and length symbols and of a distance tree indicative of codes that correspond with distance symbols.

Example 38 includes the subject matter of any of Examples 32-37, and wherein the means for determining the size of the smallest variable size code comprises means for determining one or more of a size of the smallest code associated with a literal symbol, a size of the smallest code associated with a length symbol, or a size of the smallest code associated with a distance symbol.

Example 39 includes the subject matter of any of Examples 32-38, and wherein the means for decoding the variable size code at a present position with the deterministic decoder comprises means for selecting, as a function of a previously decoded code, one of a distance decoder or a literal-length decoder included in the deterministic decoder to perform the decode at the present position.

Example 40 includes the subject matter of any of Examples 32-39, and wherein the means for performing the speculative decodes over the range of subsequent positions comprises means for performing speculative decodes with literal-length decoders and distance decoders for multiple offsets from the present position in the compressed data.

Example 41 includes the subject matter of any of Examples 32-40, and wherein the means for performing the speculative decodes over the range of subsequent positions comprises means for performing speculative decodes with literal-length decoders over one range of offsets from the present position and with distance decoders over a different range of offsets from the present position.

Example 42 includes the subject matter of any of Examples 32-41, and wherein the means for performing the speculative decodes with literal-length decoders over one range of offsets comprises means for performing speculative decodes of codes associated with literal symbols and length symbols over a range of offsets determined as a function of the smallest code size associated with a literal symbol.

Example 43 includes the subject matter of any of Examples 32-42, and wherein the means for performing the speculative decodes with distance decoders over the different range of offsets comprises means for performing speculative decodes of codes associated with distance symbols over a range of offsets determined as a function of the smallest code size associated with a length symbol.

Example 45 includes the subject matter of any of Examples 32-44, and further including means for selecting a speculatively decoded code associated with a literal symbol, a length symbol, or a distance symbol as a function of a type of the deterministically decoded code.

Example 46 includes the subject matter of any of Examples 32-45, and wherein the means for selecting the speculatively decoded code comprises means for selecting, in response to a determination that the deterministically decoded symbol is associated with a length symbol, a speculatively decoded code associated with a distance symbol.

The invention claimed is:

1. A managed node for speculatively decompressing data, the managed node comprising:
   a deterministic decoder;
   one or more speculative decoders; and
   a decompression manager to:
      decode a variable size code at a present position in compressed data with the deterministic decoder and concurrently perform speculative decodes over a range of subsequent positions in the compressed data with the one or more speculative decoders, wherein the range of subsequent positions are determined as a function of the present position and a determined smallest code size;
      determine a position of a next code by adding a size of the deterministically decoded code to the present position;
      determine whether the position of the next code is within the range; and
      output, in response to a determination that the position of the next code is within the range, a first symbol associated with the deterministically decoded code and a second symbol associated with a speculatively decoded code at the position of the next code.

2. The managed node of claim 1, wherein the decompression manager is further to:
   output, in response to a determination that the position of the next code is not within the range, the first symbol without a second symbol.

3. The managed node of claim 1, wherein the decompression manager is further to:
   obtain the compressed data, wherein the compressed data is compressed with one or more trees;
   read a header of the compressed data, wherein the header includes a tree descriptor indicative of variable size codes associated with symbols in the compressed data; and
   determine the size of the smallest variable size code from the header.

4. The managed node of claim 3, wherein to obtain the compressed data comprises to obtain data compressed with one or more Huffman trees.

5. The managed node of claim 3, wherein to obtain the compressed data comprises to obtain data compressed with a literal-length tree indicative of codes that correspond with literal symbols and length symbols, and a distance tree indicative of codes that correspond with distance symbols.

6. The managed node of claim 3, wherein to read the header of the compressed data comprises to read a header that includes a tree descriptor of a literal-length tree indicative of codes that correspond to literal symbols and length symbols and of a distance tree indicative of codes that correspond with distance symbols.

7. The managed node of claim 5, wherein to determine the size of the smallest variable size code comprises to determine one or more of a size of the smallest code associated with a literal symbol, a size of the smallest code associated with a length symbol, or a size of the smallest code associated with a distance symbol.

8. The managed node of claim 1, wherein the deterministic decoder comprises a distance decoder and a literal-length decoder, and to decode the variable size code at a present position with the deterministic decoder comprises to select, as a function of a previously decoded code, one of the distance decoder or the literal-length decoder to perform the decode at the present position.

9. The managed node of claim 1, wherein to perform the speculative decodes over the range of subsequent positions comprises to perform speculative decodes with literal-length decoders and distance decoders for multiple offsets from the present position in the compressed data.

10. The managed node of claim 1, wherein to perform the speculative decodes over the range of subsequent positions comprises to perform speculative decodes with literal-length decoders over one range of offsets from the present position and with distance decoders over a different range of offsets from the present position.

11. The managed node of claim 10, wherein to perform the speculative decodes with literal-length decoders over one range of offsets comprises to perform speculative decodes of codes associated with literal symbols and length symbols over a range of offsets determined as a function of the smallest code size associated with a literal symbol.

12. The managed node of claim 10, wherein to perform the speculative decodes with distance decoders over the different range of offsets comprises to perform speculative decodes of codes associated with distance symbols over a range of offsets determined as a function of the smallest code size associated with a length symbol.

13. One or more non-transitory, machine-readable storage media comprising a plurality of instructions stored thereon that, when executed by a managed node, cause the managed node to:
 decode a variable size code at a present position in compressed data with a deterministic decoder and concurrently perform speculative decodes over a range of subsequent positions in the compressed data with one or more speculative decoders, wherein the subsequent positions are determined as a function of the present position and a determined smallest code size;
 determine a position of a next code by adding a size of the deterministically decoded code to the present position;
 determine whether the position of the next code is within the range; and
 output, in response to a determination that the position of the next code is within the range, a first symbol associated with the deterministically decoded code and a second symbol associated with a speculatively decoded code at the position of the next code.

14. The one or more non-transitory, machine-readable storage media of claim 13, wherein the plurality of instructions, when executed, further cause the managed node to output, in response to a determination that the position of the next code is not within the range, the first symbol without a second symbol.

15. The one or more non-transitory, machine-readable storage media of claim 13, wherein the plurality of instructions, when executed, further cause the managed node to:
 obtain the compressed data, wherein the compressed data is compressed with one or more trees;
 read a header of the compressed data, wherein the header includes a tree descriptor indicative of variable size codes associated with symbols in the compressed data; and
 determine a size of the smallest variable size code from the header.

16. The one or more non-transitory, machine-readable storage media of claim 15, wherein to obtain the compressed data comprises to obtain data compressed with one or more Huffman trees.

17. The one or more non-transitory, machine-readable storage media of claim 15, wherein to obtain the compressed data comprises to obtain data compressed with a literal-length tree indicative of codes that correspond with literal symbols and length symbols, and a distance tree indicative of codes that correspond with distance symbols.

18. The one or more non-transitory, machine-readable storage media of claim 15, wherein to read the header of the compressed data comprises to read a header that includes a tree descriptor of a literal-length tree indicative of codes that correspond to literal symbols and length symbols and of a distance tree indicative of codes that correspond with distance symbols.

19. The one or more non-transitory, machine-readable storage media of claim 18, wherein to determine the size of the smallest variable size code comprises to determine one or more of a size of the smallest code associated with a literal symbol, a size of the smallest code associated with a length symbol, or a size of the smallest code associated with a distance symbol.

20. The one or more non-transitory, machine-readable storage media of claim 13, wherein the deterministic decoder comprises a distance decoder and a literal-length decoder, and to decode the variable size code at a present position with the deterministic decoder comprises to select, as a function of a previously decoded code, one of the distance decoder or the literal-length decoder to perform the decode at the present position.

21. The one or more non-transitory, machine-readable storage media of claim 13, wherein to perform the speculative decodes over the range of subsequent positions comprises to perform speculative decodes with literal-length decoders and distance decoders for multiple offsets from the present position in the compressed data.

22. The one or more non-transitory, machine-readable storage media of claim 13, wherein to perform the speculative decodes over the range of subsequent positions comprises to perform speculative decodes with literal-length decoders over one range of offsets from the present position and with distance decoders over a different range of offsets from the present position.

23. The one or more non-transitory, machine-readable storage media of claim 22, wherein to perform the speculative decodes with literal-length decoders over one range of offsets comprises to perform speculative decodes of codes associated with literal symbols and length symbols over a range of offsets determined as a function of the smallest code size associated with a literal symbol.

24. A method for speculatively decompressing data, the method comprising:
 decoding, by a managed node, a variable size code at a present position in compressed data with a deterministic decoder and concurrently performing speculative decodes over a range of subsequent positions in the compressed data with one or more speculative decoders, wherein the range of subsequent positions are determined as a function of the present position and a determined smallest code size;
 determining, by the managed node, a position of a next code by adding a size of the deterministically decoded code to the present position;
 determining, by the managed node, whether the position of the next code is within the range; and outputting, by the managed node and in response to a determination that the position of the next code is within the range, a first symbol associated with the deterministically decoded code and a second symbol associated with a speculatively decoded code at the position of the next code.

25. The method of claim 24, further comprising outputting, by the managed node and in response to a determination that the position of the next code is not within the range, the first symbol without a second symbol.

* * * * *